INVENTORS:
MILLARD M. BRENNER
BERNARD D. STEINBERG
BY Howson & Howson
ATTYS.

INVENTORS:
MILLARD M. BRENNER
BERNARD D. STEINBERG
BY Howson & Howson
ATTYS.

INVENTORS:
MILLARD M. BRENNER
BERNARD D. STEINBERG
BY Howson & Howson
ATTYS.

INVENTORS:
MILLARD M. BRENNER
BERNARD D. STEINBERG
BY Howson & Howson
ATTYS.

INVENTORS:
MILLARD M. BRENNER
BERNARD D. STEINBERG
BY Howson & Howson
ATTYS.

INVENTORS:
MILLARD M. BRENNER
BERNARD D. STEINBERG
BY Howson & Howson
ATTYS.

INVENTORS
MILLARD M. BRENNER
BERNARD D. STEINBERG
BY Howson & Howson
ATTYS.

3,443,228
Patented May 6, 1969

3,443,228

OPTIMUM FREQUENCY COMMUNICATION SYSTEM WITH DIFFERENT TEST FREQUENCIES IN DIFFERENT TEST INTERVALS

Millard M. Brenner, Radnor, and Bernard D. Steinberg, Wyndmoor, Pa., assignors to General Atronics Corporation, Wyndmoor, Pa., a corporation of Pennsylvania Filed Nov. 22, 1965, Ser. No. 509,083
Int. Cl. H04b 3/10; H04l 5/22
U.S. Cl. 325—56 7 Claims

ABSTRACT OF THE DISCLOSURE

A frequency diversity system employing a carrier-wave transmitted signal having periodically-recurrent test intervals therein during each of which a fixed test frequency is transmitted, the fixed test frequencies being different, however, during successive test intervals according to a predetermined recurrent pattern; the message intelligence is transmitted on a carrier in the intervals between the test intervals. The carrier frequency for the message intelligence is settable to any one of the test frequencies, and the test frequency to which it is set at any given time is determined by an electrical comparison made in a receiver between the strength of the received carrier-wave signal during a message interval and the strength of the received carrier-wave signal during the next test interval. A reply signal, generated at the receiver in response to this comparison, is transmitted back to the transmitter and utilized to adjust the message carrier frequency to a different one of the test frequencies if the above-mentioned comparison of the receiver indicates that this would be advantageous for best propagation characteristics.

This invention relates to frequency diversity systems such as are used in tropospheric radio communications.

It is known that radio communication may be provided between points on the earth's surface separated by more than the line of sight range, by means of so-called tropospheric scatter propagation. However, in systems employing tropospheric scatter propagation the received signal is subject to severe fading due to changes in atmospheric conditions which occur not only at relatively slow rates, as from minute to minute, hour to hour, day to day or month to month, but also at relatively rapid rates between about 0.1 and 10 cycles per second, the latter being known as "fast fades." Such "fast fades" are generally presumed to be due to the effect of many random scatters in the common volume between the transmitter and receiver; because these scattering sources move about, they cause the reception of multiple signals in random phases with respect to each other which sometimes tend to cancel and sometimes to reinforce each other.

Diversity techniques are commonly employed to minimize the effects of such fast fading. Two common forms of diversity employed in tropospheric communications are space diversity and frequency diversity, used individually or in combination with each other. In a typical space diversity system two antennas are used at each receiver, which antennas are spaced from each other by many wavelengths of the transmitted radio signal to provide a plurality of different propagation paths between transmitter and receiver, the fading of the signals propagated by one path between the transmitter and the receiver being relatively independent of the fading occuring over the other propagation path. Typically the signals received over the two paths are combined at the receiver, the probability of the combined signal having a given depth of fade being substantially less than the probability that one of the signals will have that depth of fade. The number of substantially independent propagation paths thus established determines the order of diversity provided.

In frequency diversity systems the intelligence signal may be transmitted on two or more carriers of different frequencies, the number of different carrier frequencies employed indicating the order of frequency diversity. A common class of diversity system combining both space and frequency diversity in a two-way communication system may, for example, employ two antennas at each end of the communication link and two distinct carrier frequencies, giving an order of diversity of four. Such a system would commonly require two transmitting power amplifiers, two antennas, four receivers and a combiner at each end of the space link.

In one common type of frequency diversity system the carrier is continuously radiated simultaneously on two or more frequencies, the intelligence signals conveyed by the different carriers being combined at the receiver. Since at any time one or more of the carriers may provide poor communication between transmitter and receiver due to fast fading, the power radiated on that carrier at such times may be considered as wasted. A system which is superior in this respect is one in which the intelligence is radiated on a single carrier of variable frequency, the carrier frequency being vaired until the frequency providing least attenuation is located after which it is held at the latter frequency value for an interval corresponding to the stability time of the medium, after which another frequency may be chosen.

One system known in the prior art for accomplishing the latter operation periodically interrupts the intelligence transmission at a relatively high rate with respect to the rate of fast fading to transmit a test transmission during a test interval, the test transmission during each such interval consisting of a sequence of successive carrier frequencies varying either continuously or stepwise between different successive frequency values. The receiver then detects which carrier frequency produces the strongest received signal and transmits back to the transmitting terminal a coded reply signal indicating which carrier frequency is optimum at the time and causing the transmitter to operate at that optimum frequency until the next periodically-recurrent test interval.

In the latter type of system in which each composite test transmission comprises in effect a series of immediately-successive pulses of carrier-waves of respectively different frequencie, each such pulse must have a duration T of at least $1/B$ for reception without intolerable deterioration of signal-to-noise-ratio, where B is the bandwidth of the receiver. If $n$ different carrier frequencies are transmitted successively during the composite test interval by $n$ corresponding test pulses, then the test interval is at least $n$T seconds in duration, which time is taken out of the time otherwise available for intelligence transmission. In addition, to be able to cause selection of any one of the $n$ frequencies, the reply signal must contain $n$ levels of information, which necessitates additional equipment in the system and more time taken out of the return intelligence transmission (or higher signal-to-noise-ratio in the return intelligence transmission) than if, for example, only two levels of reply information were required. Furthermore, if the order of diversity $n$ is to be changed by the operator to some lesser number, the lesser amount of time required for each composite test transmission and the lower number of information levels required for the reply signal make necessary corresponding changes in time constants and other filtering and logic elements of the transmitting and receiving equipment if the fullest value is to be obtained from the shorter test interval. Such changes in order of diversity are desirable, for example, when the range between transmitter and receiver is changed substantially.

In the latter type of system, the relatively long composite test intervals and the relatively long times between them produce a relatively strongly-peaked frequency spectrum for the test variations and therefore make probable substantial undesirable interference with the message intelligence signals. In addition, no diversity action at all is produced for fades occurring at rates high compared with the rate of recurrence of the composite test intervals. The importance of such diversity action can be understood by the fact that a diversity of only 2 can be equivalent to a twenty-fold increase in transmitted power, when the maintenance of the received signal above a given level is considered.

A further problem of maintaining proper timing and synchronization between receiver and transmitter also arises in such intermittently-testing frequency diversity systems, particularly where the receiver characteristics must be changed to produce optimum receptivity for each of the transmitted frequencies. For example, while it is highly desirable to use a superheterodyne type of receiver for best signal-to-noise performance, in such case the the local oscillator frequency at the receiver should changed at the proper times to specific corresponding values for each different transmitted carrier frequency. It is also desirable, especially for two-way communication between mobile military equipments, that the timing control and synchronizing system used be operable without requiring prearrangement between the operators of the two equipments, and be capable of independent action in the two directions of communication. Furthermore the timing control and synchronizing arrangement used should not interfer with message transmission or with the diversity testing procedure.

Accordingly it is an object of the invention to provide a new and useful frequency diversity system, and new and useful transmitters and receivers for use in such systems.

Another object is to provide such a system suitable for use in a two-way tropospheric communication system.

Another object is to provide such a system and apparatus for use therein which provide performance of high transmission reliability with a minimum of equipment and cost.

Another object is to provide a system capable of a high order of diversity with a minimum degree of interference to intelligence being communicated by the system.

A further object is to provide such a system and apparatus for use therein which permits ready changing of the order of diversity with a minimum of changes in the elements of the system.

Another object is to provide such a system and apparatus for use therein which supplies at least some degree of diversity even for very fast fading components, yet maintains adequate time intervals for message transmission.

Another object is to provide new and useful timing and synchronizing apparatus suitable for use in a frequency diversity system.

A further object is to provide such timing and synchronizing apparatus in which transmission of only a small quantity of control information is required.

A still further object is to provide such timing and synchronizing apparatus which does not interfer materially with the transmission of message intelligence, and which operates in a two-way communication system substantially independently in the two directions without requiring special prearrangement between operators of the two terminal equipments and without requiring an accurate knowledge of the distance between the equipments.

Another object is to provide a frequency diversity system in which the order of diversity can be easily changed.

The above objects are achieved by the provision of a diversity system in which the frequency of a transmitted carrier wave is shifted between different values during successive short-duration test intervals which are spaced from each other by long-duration intervals during which message information is transmitted on the carrier wave, and in which the strengths of the received signals produced by the different transmitted carrier-wave frequencies are compared at the receiver and a reply signal transmitted from the receiver to the transmitter to cause subsequent message transmission on the most favorable carrier-wave frequency. Thus, unlike certain prior-art systems in which a series of immediately-successive individual test pulses of different frequencies is transmitted as a composite test transmission before, and then again after, each relatively long message interval, in the system of the invention the individual test pulses of different frequencies are time-spaced from each other and the intervals between the individual test pulses constitute the message intervals during which intelligence is transmitted. In the preferred embodiment of the invention, comparison is made at the receiver between the strength of each test signal and the strength of the immediately-preexisting message carrier. The reply signal transmitted from the receiver to the transmitter after each test interval in the received signal therefore indicates whether the carrier frequency occurring during the test interval or that occurring during the immediately-preceding message interval is more favorable for propagation of signals from the transmitter to the receiver. The reply signal is then utilized at the transmitter as a control signal to change the message carrier-frequency to the test frequency if the test frequency produces a stronger signal at the receiver than does the immediately-previous message carrier-frequency; otherwise the control signal leaves the message carrier-frequency at its previous value.

In the preferred form of the invention the frequencies transmitted during successive test pulses are arranged in a predetermined recurrent series preferably comprising more than two different frequencies, although it is a feature of the invention that the number and values of different frequencies in each series can readily be altered without requiring substantial other changes in the equipment, if any. Comparison of the strengths of each received test pulse with the message carrier is facilitated by using frequency modulation for the message intelligence so that the strength of the received message carrier can readily be determined despite its modulation. In the preferred form of system, the carrier-frequency control arrangement is such that if the existing message carrier-frequency produces received signals at least as strong as those occurring in response to the test pulse, then a reply signal is generated and transmitted back to the transmitter to maintain the message carrier-frequency unchanged; if the test frequency produces a received signal stronger than the received message carrier, no reply signal is generated and the transmitter automatically changes the message carrier-frequency to the test frequency. Preferably also, for minimum interference the test pulses are as short as possible compared with the message intervals and with the shortest message impulses to be communicated. Therefore the test pulse duration is the reciprocal of the effective bandwidth of the receiver. Preferably the test pulses are uniformly spaced from each other, and the reply signal may be a burst of sinewave or a continuous wave having a frequency high compared with the repetition rate of the test pulses and having a duration which is long compared with each test pulse and which constitutes a substantial fraction of the message interval. The reply signal sineware is preferably frequency-multiplexed with the message on a non-interfering basis.

As compared with prior art systems in which the test pulses of each series are grouped together in a composite test transmission preceding each long message interval, the arrangement of the invention in which the successive test pulses of each series are, in effect, spread out through the long message interval of the prior art, has a number of advantages among which are the following. First, while the above-described arrangement of the prior art is unable to provide any diversity action for very fast fades occurring in the relatively long message interval $T_0$, the arrangement of the invention is able to provide diversity of the order of 2 even for fast fades occurring in a time interval $T_0/n$, where $n$ is the number of different test intervals in the series; higher orders of diversity are provided for rapid fades occurring in times greater than $T_0/n$ and less than $T_0$. Secondly, in the arrangement of the invention the higher frequency and shorter duration of the intervals in which the message signal is interrupted to transmit the test frequencies produces a more uniform and less peaked frequency spectrum due to the interruptions than do the prior art arrangements utilizing test pulses grouped together in a composite test transmission, and hence produces a smaller probability of interfering substantially with message signals, such as the pulses of data transmission signals. Furthermore, while in the arrangement of the prior art the reply signal must contain a number of information levels equal to the number of different frequencies employed so as to enable selection of the proper one of the frequencies at the receiver, in the arrangement of the invention only two information levels are required in the reply signal, one of which may be the absence of a reply signal, with consequent advantages in the simplicity and reliability of the system. In addition, compared with prior-art systems it is a simple matter in the system of the invention to change the order of diversity merely by changing the number of different frequencies in the series through which the test frequencies are changed, which can be done by changing the operation of digital counters at the transmitter and receiver, no substantial corresponding changes in analog circuitry such as time constant networks and filters being necessary in such event; in one preferred form the diversity can be changed merely by changing a control for the count of a counter. Use of the above-described test pulse duration and spacing, message intervals and form of reply signal minimize interference between the various control and test frequencies and between the control and test frequencies and the message frequencies.

Preferably also the system of the invention uses a superheterodyne receiver in each of the two spaced terminal equipments of a two-way communication system in order to realize the signal-to-noise advantage of this class of receivers. This requires that the local oscillator of each receiver be changed to the proper frequency for best reception of each of the different carrier frequencies produced by the transmitter at the other terminal equipment during message intervals and during the various test intervals. In accordance with the preferred form of the present invention, this is accomplished by arranging for each local oscillator to be switchable by a receiver programmer among a series of different frequencies each of which is suitable for best reception of a different one of the transmitted frequencies. This is accomplished for each direction of message transmission by means of timing and synchronizing circuits which generate a synchronizing signal related in known way to the recurrence frequency of the transmitter test pulses and which control the frequency-switching of the local oscillator at the receiver at a corresponding rate. In addition to providing the proper frequency-switching rate, the receiver is controlled to produce the proper correspondence, or switching phase, between the particular receiver local oscillator frequency and the transmitter frequency being received. This is accomplished by employing a transmitted synchronizing sinewave and by initial synchronization circuits which operate each transmitter and its corresponding receiver local oscillator at a predetermined initial frequency when the equipment is first operated or when communication is momentarily lost, and by initiating the programmed series of test changes in transmitter and local oscillator frequency at the proper instant when satisfactory communication has been established between the transmitter and its corresponding receiver.

More particularly, in one synchronizing arrangement each combination of transmitter and corresponding remote receiver determies that message communication on a carrier frequency such as $F_1$ and reply communication on a carrier frequency such as $F_a$ has been established between them as follows. At one of the spaced terminal equipments, which may be designated as terminal equipment A, means are provided for sensing the reception by equipment A of a reply signal from the other terminal equipment, which may be designated terminal equipment B, thereby determining that two-way communication exists and causing the commencement of the programmed sequence of test frequencies at the first transmitter. At terminal equipment B, where the corresponding receiver is located, the generation of a reply signal by terminal equipment B and the reception of a reply signal from terminal equipment A are detected and used to cause the commencement of the programmed shift in local oscillator frequency at terminal equipment B. A similar arrangement is employed for initial synchronization and for starting programmed frequency testing for the transmitter of terminal equipment B and the corresponding receiver at therminal equipment A. Means are also provided for producing reversion to the initial synchronization condition at both terminal equipments upon any subsequent persistent loss of communication.

In another preferred synchronizing arrangement, the transmitter of each terminal equipment, such as terminal equipment A, sends a "line" synchronizing signal on a reference frequency carrier to the receiver at the other terminal; if the signal is of sufficient strength at the terminal equipment B receiver it produces a continuous reply signal at the receiver which is transmitted back to the terminal equipment A receiver. The "line" synchronizing signal is also used at receiver B to synchronize the receiver programmer circuits which control switching of the receiver local oscillator frequency, but initially actual frequency switching is inhibited. However, when the reply signal reaches terminal equipment A it causes a "frame" synchronizing signal to be transmitted by terminal equipment A for each test sequence interval in fixed phase relation to the "line" synchronizing signal and at a frequency which is an integral sub-multiple thereof, which "frame" synchronizing signal is used to start the test sequence at the terminal A transmitter and is transmitted to terminal equipment B to start the terminal equipment B local oscillator sequencing in proper time phase.

These and other objects and features of the invention will be more readily appreciated from a consideration of the following detailed description, taken in connection with the accompanying drawings, in which.

Figure 1:
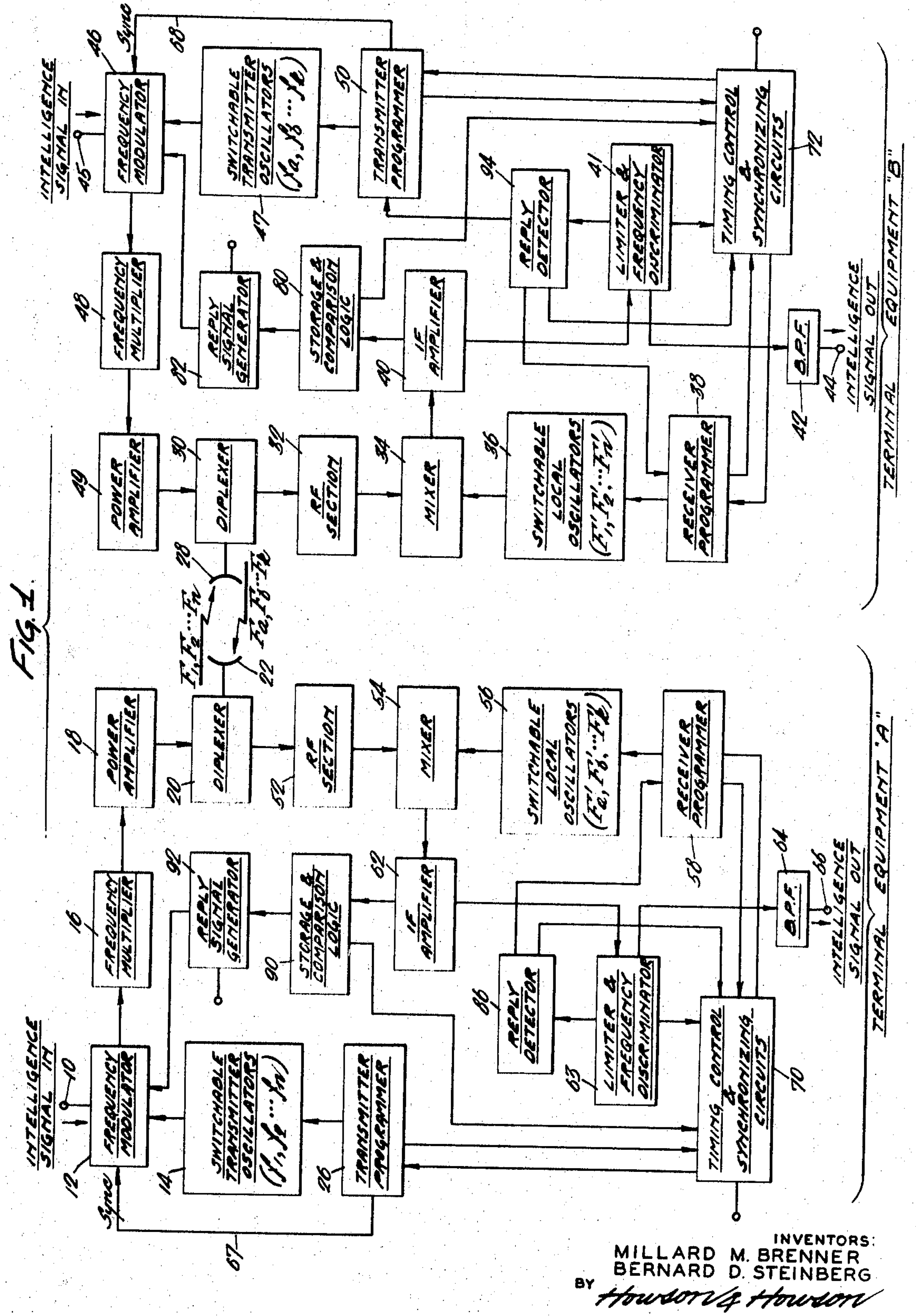
FIGURE 1 is a block diagram illustrating one preferred embodiment of the invention.

Referring now to the embodiment of the invention represented in FIGURE 1, which is presented by way of example only and without in any way limiting the scope of the invention, the figure illustrates a terminal equipment A and a terminal equipment B which together constitute a two-way communication system, each terminal equipment for example constituting a mobile military communication station. Typically the terminal equipments may transmit on carrier frequencies of the order of hundreds to thousands of megacycles per second and may be spaced from each other at different times by different distances beyond line of sight such as 50 to 100 miles, so that tropospheric propagation with its attendant fast fades is relied upon for communication; as is well known, the fast fades are frequency dependent in the sense that the correlation between fast fades of signals of different frequencies decreases as the separation of the frequencies increases. The system is such that independent message information can be transmitted from terminal equipment A to terminal equipment B and from terminal equipment B to terminal equipment A.

More particularly, considering the transmitter portion of terminal equipment A, an intelligence signal of any convenient form, such as intelligence-modulated pulses or conventional audio signals, are applied to intelligence signal input terminal 10 and thence to a conventional frequency modulator 12. The carrier waves for modulator 12 are supplied thereto from a bank of electronically-switchable transmitter oscillators 14, and the resultant frequency-modulated carrier wave is then passed through a conventional frequency multiplier 16 to raise the frequencies to the frequency band desired for transmission. The latter higher-frequency signal is then passed through a conventional wide band power amplifier 18, such as a traveling wave tube amplifier for example, and by way of a conventional diplexer 20 to a suitable radiating and receiving antenna 22 for radiation into the troposphere. The carrier frequency F radiated at any time from antenna 22 is determined by which of the transmitter oscillators 14 is switched to the carrier-wave input of frequency modulator 12 at that time. In forms of the invention in which the frequency multiplier 16 is not utilized, the radiated frequency F will have a repeating sequence of values $F_1, F_2 \ldots F_n$ equal to the oscillator frequencies $f_1, f_2, \ldots f_n$ respectively; in the present example in which a frequency multiplied 16 is utilized, the radiated frequencies $F_1, F_2 \ldots F_n$ are determined by, and correspond in known predetermined manner to, the transmitter oscillator frequencies $f_1, f_2 \ldots f_n$ respectively, but are higher in frequency. The switching among the various transmitter oscillators is controlled from transmisser programmer 26 in a manner to be described further hereinafter. thereby in turn controlling the radiated carrier-wave frequency F.

The transmitted signal from antenna 22 then passes through the tropospheric space link and is received by the receiving and transmitting antenna 28 of terminal equipment B. The so-received signal is then passed through diplexer 30 and a conventional receiver RF section 32 to the usual mixer 34, wherein it is heterodyned with a local oscillator signal from electronically-switchable local oscillators 36; the latter local oscillators provide oscillations at any given time at one of the frequencies $F'_1, F'_2 \ldots F'_n$ as determined by control signals from a receiver programmer 38; more particularly, the local oscillators 36 are switched so as to supply an oscillation of frequency $F'_1$ to mixer 34 when signals of carrier-wave frequency $F_1$ are to be received, to supply oscillations at frequency $F'_2$ to mixer 34 when carrier-wave signals of frequency $F_2$ are to be received, etc., thereby to provide a constant fixed value of intermediate frequency for all frequencies of received carrier wave.

The output of mixer 34 at the intermediate frequency is supplied to the input of IF amplifier 40 and thence to an FM detector which in this example comprises limiter and frequency discriminator 41, wherein it is amplified, limited to a substantially constant amplitude and frequency-detected to re-derive the modulation components from the carrier wave signal. The output of limiter and frequency discriminator 41 is then supplied to a bandpass filter 42 for passing the message-intelligence frequency components to an intelligence signal output terminal 44 while rejecting other frequency components included in the received signal for timing control and synchronizing purposes described hereinafter.

Similarly, an intelligence signal at terminal equipment B applied to intelligence signal input terminal 45 is supplied to frequency modulator 46 wherein it modulates that frequency of carrier-waves supplied to the modulator from the bank of electrically-switchable transmitter oscillators 47, the resultant frequency-modulated signal being frequency multiplied in frequency multiplier 48 and amplified in power amplifier 49 whence it passes through diplexer 30 and is radiated from antenna 28 through the tropospheric space link to antenna 22 of terminal equipment A; the frequency supplied by switchable transmitter oscillators 47 is controlled by transmitter programmer 50. At terminal equipment A the so-received signal is passed through a conventional RF section 52 to mixer 54, wherein it is heterodyned with oscillations of appropriate frequencies applied thereto from the bank of electronically-switchable local oscillators 56 to produce the appropriate intermediate-frequency output from the mixer for each frequency of received signal. The frequency of local oscillation supplied to the mixer at any given time is controlled by receiver programmer 58. Designating the frequencies of the switchable transmitter oscillators 47 at terminal equipment B as $f_a, f_b \ldots f_k$ and the frequencies of the carrier waves transmitted by antenna 28 in response thereto as $F_a, F_b \ldots F_n$, the switchable local oscillators 56 will provide frequencies of $F'_a, F'_b \ldots F'_k$ differing from the corresponding received carrier-wave frequencies by the intermediate frequency.

The intermediate-frequency output of mixer 54 is supplied to IF amplifier 62 and an FM detector comprising limiter and frequency discriminator 63 wherein it is amplified, amplitude-limited and frequency-detected to recover the modulation components, the latter signal then being applied to bandpass filter 64 which passes the message-intelligence frequency components to intelligence signal output terminal 66 while rejecting timing and synchronizing signal components.

It will be understood that while it is possible to utilize for the receivers in the two terminal equipments a very wide-band IF amplifier with a fixed-frequency local oscillator or a tuned amplifier not employing a local oscillator, and that in such cases no special timing and synchronizing arrangements will be required, in many applications use of such types of receivers would adversely affect the signal-to-noise ratio at the input to the FM detector and hence oppose the improvement which is obtained by the use of frequency diversity. Therefore the use of a receiver employing a local oscillator is greatly to be preferred, and accordingly appropriate circuitry is employed to switch the local oscillator frequencies in accordance with changes in the transmitted carrier frequencies so as to obtain optimum receiver sensitivity and signal-to-noise ratio. Thus transmitter programmers 26 and 50 supply synchronizing signals to modulators 12 and 46 over connections 67 and 68 respectively and there are provided at terminal equipment A timing control and synchronizing circuits 70 and at terminal equipment B timing control and synchronizing circuits 72. Timing control and synchronizing circuits 70 supply timing and synchronizing signals to transmitter programmer 26 and receiver programmer 58 and receive similar signals from transmitter programmer 26, receiver programmer 58, limiter and frequency discriminator 63, reply detector 86 and storage and comparison logic circuit 90; similarly, timing control and synchronizing circuits 72 at terminal equipment B supply timing and synchronizing signals to transmitter programmer 50 and to receiver programmer 38 and receive similar signals from transmitter programmer 50, limiter and frequency discriminator 41, reply detector 94, storage and comparison circuit 80 and receiver programmer 38.

Provided at terminal equipment B is a storage and comparison logic circuit 80 supplied with signals from IF amplifier 40, which receives and stores a signal indicative of the IF signal strength produced at a give time—preferably the IF signal strength during a given message interval—and compares it with the IF signal strength produced in response to the next-received carrier-wave signal of different carrier frequency—preferably the carrier-wave signal produced during the next test interval. Suitable correction of amplitude to compensate for the different time duration of the two signals is incorporated. In addition it includes logic circuits for providing a reply control signal if the message carrier frequency produces a usable magnitude of IF signal at least as great as that produced by the test frequency. The reply control signal is supplied to a reply signal generator 82 which in response thereto generates a reply signal which is applied as a modulation input to frequency modulator 46, and is therefore transmitted as frequency modulation of the carrier wave transmitted from antenna 28 of terminal equipment B to antenna 22 of terminal equipment A. As described hereinafter in more detail, the form and frequency of the reply signal is such as not to interfere with the message modulation or the synchronizing signal modulation. At terminal equipment A the received reply signal passes through the diplexer 20, RF section 52, mixer 54, IF amplifier 62 and limiter and frequency discriminator 63 to a reply detector 86 which detects the presence of the reply signal in the output of the frequency discriminator and in response thereto supplies a control signal to the transmitter programmer 26; presence of the reply signal in the output of the limiter and frequency discriminator 63 thus indicates that the carrier-wave frequency being used to transmit the message intelligence from terminal equipment A to terminal equipment B has a produced at IF amplifier 40 of terminal equipment B a usable signal at least as great as that due to the test signal next received by terminal equipment B, and therefore that the transmitter programmer 26 should cause the presently-existing frequency of message carrier wave to continue to be supplied from switchable transmitter oscillators 14 to frequency modulator 12; on the other hand, absence of an output from reply detector 86 permits the transmitter programmer 26 to change the carrier frequency supplied to frequency modulator 12 during the next message interval to that of the last-occurring test frequency.

Figures 2A, 2B, 3A, 3B:
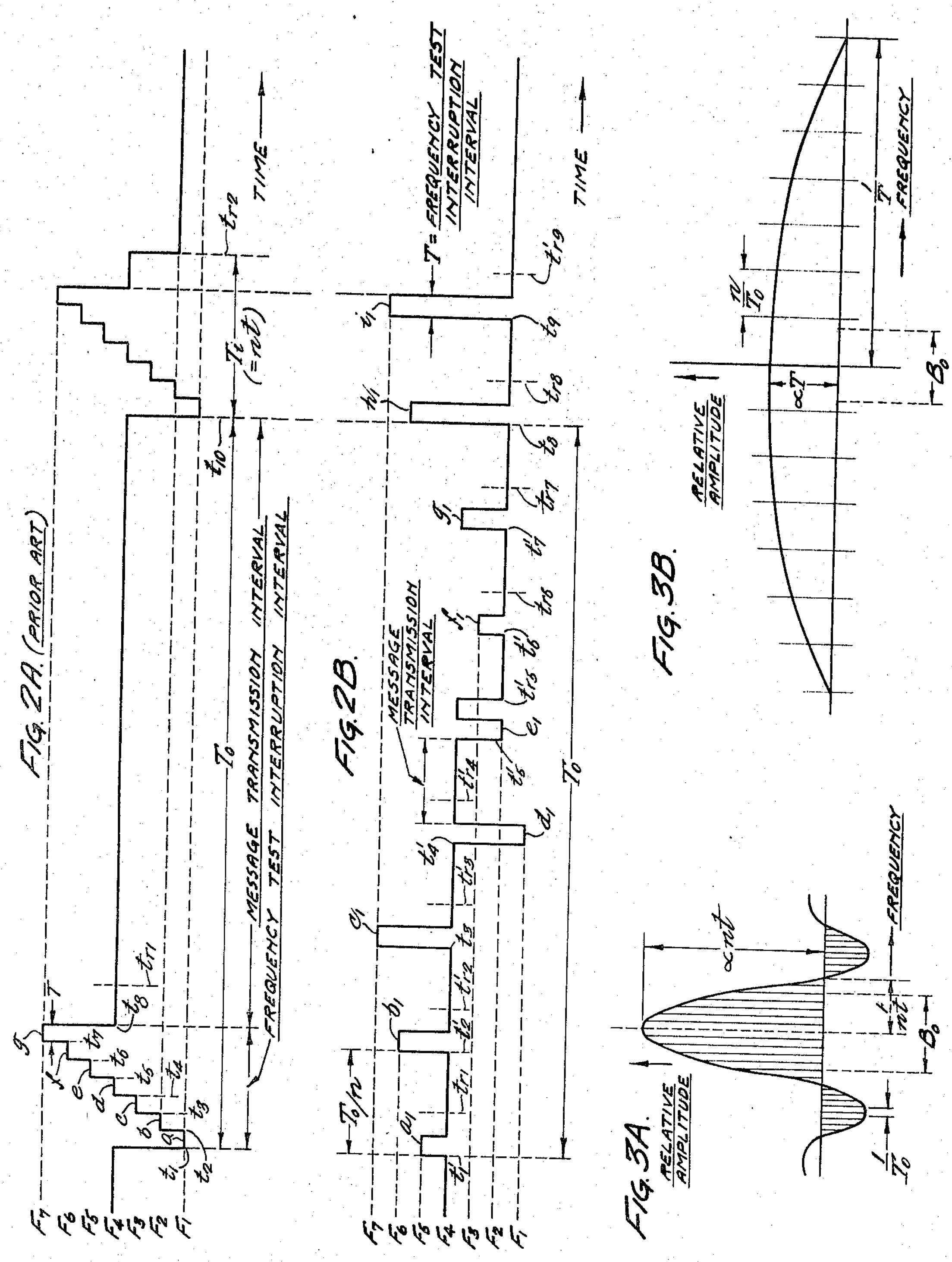
FIGURES 2A and 2B are graphical representations plotted to common time scale illustrating, respectively, operation in accordance with the prior art and operation in accordance with the invention.
FIGURES 3A and 3B are graphical representations illustrating frequency spectra and pertaining respectively to systems of the prior art and systems of the invention.

The nature of this overall operation and its distinction from that involved in certain prior-art systems will become more apparent from a consideration of FIGURES 2A and 2B, which are illustrative only and not necessarily to scale. In the latter figures abscissae represent time plotted to a common scale; in FIGURE 2A ordinates represent carrier frequencies produced by a system of the prior art, while ordinates in FIGURE 2B represent carrier frequencies produced by the above-described system of the present invention. Referring first to FIGURE 2A, the situation is shown for the case in which the carrier-wave frequency transmitted by antenna 22 of terminal equipment A is varied during recurrent composite test pulse intervals of duration $T_1$ through successive values $F_1$, $F_2$, $F_3$, $F_4$, $F_5$, $F_6$ and $F_7$ in the corresponding respective test pulse intervals $a$, $b$, $c$, $d$, $e$, $f$ and $g$, each of the latter individual test intervals having a duration T. The interval between the beginnings of two successive composite test interruptions is designated at $T_0$. In the example shown the carrier-wave frequency during the message transmission interval preceding $t_1$ is $F_4$. The carrier-wave signals transmitted during the seven test intervals between $t_1$ and $t_8$ are received at the terminal equipment B and the strengths of the seven received carrier signals produced thereby compared to determine which of the test frequencies produces the strongest received carrier signal. In the example shown the frequency $F_4$ initially produced the strongest received carrier signal, and hence the reply signal received back at the transmitter at the time $t_{r1}$ causes the message carrier frequency to remain at the value $F_4$. However, when the individual test frequencies transmitted in the next composite test interval beginning at the time $t_{10}$ are received and compared at the receiver, the receiver circuitry determines that the strongest received carrier signals now are produced in response to the carrier-wave frequency $F_2$, and therefore at the time $t_{r2}$ the carrier-wave frequency is changed from $F_4$ to $F_2$ and remains at $F_2$ throughout the remainder of that message interval. This process repeates continuously at intervals $T_0$.

Referring now to FIGURE 2B illustrating operation in accordance with the invention, in the interval $T_0$ the time available for message transmission is interrupted seven times during individual test intervals each of duration T, as at $a_1$, $b_1$, $c_1$, $d_1$, $e_1$, $f_1$ and $g_1$, during which successive different test frequencies are transmitted, but in this case the individual test intervals are spaced uniformly from each other throughout the interval $T_0$ rather than occurring immediately successively in a single composite test interval as in the case illustrated in FIGURE 2A. In FIGURES 2A and 2B the width T of the test pulse is shown as the same in order that the two systems can be compared on an equal IF bandwidth basis. More generally, if $n$ different test frequencies are used, the test pulses are spaced by $T_0/n$ and require a total time $n$T out of each period $T_0$. Thus the total time available for message transmission and the total interruption time for frequency testing is the same in the system of the invention as in the arrangement illustrated in FIGURE 2A, but important advantages described hereinafter are obtained.

More specifically with respect to FIGURE 2B, during the message interval immediately prior to $t'_1$ the carrier frequency radiated by antenna 22 of terminal equipment A is $F_4$. During the first test transmission interval $a_1$ this carrier frequency is momentarily changed to $F_5$, and the received carrier signal strength produced at the terminal equipment B in response to test transmission $a_1$ is compared by storage and comparison logic circuit 80 with the received carrier signal strength produced in response to carrier-wave frequency $F_4$; an indication of which of the frequencies $F_4$ and $F_5$ produces the stronger received carrier signal strength is returned to the equipment A transmitter, for example in the form of the presence or absence of a reply signal, at the time $t'_{r1}$ very shortly after the test frequency interval $a_1$. In the example illustrated it is assumed that the frequency $F_4$ produces the stronger received signal and hence the carrier-wave remains at frequency $F_4$ during the subsequent message interval of duration $T_0/7$ until the time $t'_2$ at which the frequency is shifted momentarily to the new test frequency $F_6$ during the test interval $b_1$. This operation continues throughout the time $T_0$, with the other fixed carrier wave frequencies $F_7$, $F_1$, $F_2$, $F_3$ and $F_4$ being produced during the test intervals $c_1$, $d_1$, $e_1$, $f_1$ and $g_1$, and with the corresponding reply signals being produced at the equipment A transmitter at times $t'_{r3}$, $t'_{r4}$, $t'_{r5}$, $t'_{r6}$ and $t'_{r7}$, respectively. In the example shown the message carrier frequency $F_4$ was found by the equipment B receiver to be more effective for transmission than the test frequencies until a carrier-wave of frequency $F_2$ was received in response to test transmission $e_1$; the equipment B receiver then returned a reply signal to the equipment A transmitter at time $t'_{r5}$ indicating that $F_2$ has produced a usable received signal more satisfactory than $F_4$, in response to which reply signal the message carrier-wave frequency was changed by the transmitter programmer to the value $F_2$, at which it will remain until changed later in the same manner by a determination that another frequency has become more effective for communication. This programmed sequence of test frequency transmissions, received signal strength comparisons and possible changes in carrier frequencies then repeats itself cyclically. The test frequencies are understood to be spaced sufficiently from each other that there is little correlation between fast fades for the various test frequencies. Also, the test pulses are spaced sufficiently close to each other in time that all seven frequencies are sampled during the time that the received signal strength remains relatively constant, thus providing an effective diversity of $n=7$ for most fast fades. However, the invention is not limited to any particular values of frequency or of $n$, or to any particular sequence of test frequencies.

It will be understood that terminal equipments A and B in this example are identical with the exception that different carrier-wave and local oscillator frequencies are used, and an operation basically the same as that described above occurs for the opposite direction of communication of message intelligence from terminal equipment B to terminal equipment A. In the latter case the transmitter programmer 50 switches the transmitter oscillators 47 so as to cause radiation from antenna 28 of a repeating sequence of different carrier-wave frequencies $F_a$, $F_b$ . . . $F_k$, which in the present example can again be seven different test frequencies. Terminal equipment A includes a storage and comparison logic circuit 90 and a reply signal generator 92 constructed and connected analogously to corresponding elements 80 and 82 in terminal equipment B so as to compare the effectiveness of the message carrier-frequency with the effectiveness of various test frequencies $F_a$, $F_b$ . . . $F_k$ and to supply to frequency modulator 12 a reply signal indicative of whether the message carrier-wave or the test frequency signal produces the stronger signal at IF amplifier 62. The latter reply signal is received by terminal equipment B and detected by reply detector 94 which in turn supplies a control signal to transmitter programmer 50 to shift the transmitted message carrier-frequency to any new frequency found to be more effective than the pre-existing message carrier-frequency for communication from equipment B to equipment A.

Referring now to FIGURES 2A and 2B again, it will be seen that the system of the invention is capable of providing frequency diversity improvements not provided by the above-described prior art system, although both provide the same order of diversity $n$ for the slower components of fast fading, taking place with a period greater than $T_0$. More particularly, in a system of the type whose operation is shown in FIGURE 2A comarison and correction are only possible at intervals $T_0$ while in the system of the invention, as shown in FIGURE 2B, comparison and correction are made possible at intervals $T_0/n$, e.g. $T_0/7$ in the example illustrated. More particularly, a frequency diversity of the order of two is provided for fast fades occurring within any time interval $T_0/n$, such as between $t'_1$ and $t'_2$, and frequency diversity of the order of three is provided for fast fades occurring in the interval $2T_0/n$, for example in the interval between $t'_1$ and $t'_3$, etc. Thus while the order of diversity corresponding to the full capability of the system is not obtained except for fade times of about $T_0$ or greater, nevertheless useful and advantageous orders of diversity are also provided for much faster fades. This is important when it is considered that troposcatter links of the subject type are often required to perform with reliabilites of 99.9% to 99.99%.

A further advantage of the invention will be apparent from a comparison of FIGURES 3A and 3B, in which abscissae represent frequency and ordinates represent relative amplitude, to a common scale for the two figures. In FIGURE 3A the ordinates of the graph represent amplitudes of frequency components in the frequency spectrum of the composite message interruption intervals of duration $T_1$, or $nT$, shown in FIGURE 2A while ordinates in FIGURE 3B represent frequency components in the frequency spectrum of the interruption test intervals for a system operating in accordance with the invention as shown in FIGURE 2B.

FIGURES 3A and 3B are drawn for the case $n=7$. The base bandwidth of the message signal is also shown on equal scale in FIGURES 3A and 3B as $B_0$, which is the bandwidth of the bandpass filters 42 and 64 of FIGURE 1. The energy content of the spectrum of FIGURE 3A is 7 (or $n$) times greater than the energy content of the spectrum of FIGURE 3B; however, there are seven (or $n$) occurrences of the interruption represented by FIGURE 3B, to every one occurrence of the interruption represented by FIGURE 3A; therefore the total interruption energy is equal in the two cases over the period $T_0$ or any multiple of $T_0$. However, the spectral and temporal distribution of the interruption energy represented by FIGURE 3B is more favorable in that in interferes less with the message signal being transmitted over the base-bandwidth $B_0$. With regard to spectral distribution, inspection of FIGURES 3A and 3B shows that a considerably smaller portion of the spectral content shown in FIGURE 3B lies within the baseband spectral region $B_0$ than in that of FIGURE 3A resulting in lower average interference energy with the message energy which occupies $B_0$. Furthermore, the greater concentration of the energy of FIGURE 3A in time, compared with that of FIGURE 3B, is more likely to interfere seriously with the individual pulses in data transmission messages.

It is also apparent that for a system corresponding to FIGURE 2A the reply signal must be capable of indicating which one of the seven test frequencies produces the strongest received signal strength and hence must contain seven information levels, whereas in a system operating as illustrated in FIGURE 2B in which the effects of only two frequencies are compared at a given time at the receiver, the reply signal need only indicate which of the two frequencies produces the stronger signal, and hence only two levels of reply information are required. This makes possible considerable simplification in the equipment used in the system of the invention. In addition if, for example, the order of diversity in a system operating as illustrated in FIGURE 2A is to be decreased or increased, the width of the composite interruption pulse must be changed correspondingly, and therefore corresponding changes in time constant and filter circuits of the system are generally required to be made if optimum performance is required. In the system of the invention, on the other hand, the widths and spacings of the test pulses can be left constant and the order of diversity changed merely by changing the number of test frequencies used in each cycle of the test frequency sequence, and therefore without requiring changes in filter and time constant networks in the system.

The duration T of each of the individual tests pulses should be selected with regard to the receiver bandwidth and the shortest message impulse to be communicated. The minimum length of test pulse which can be received without substantial degradation of test pulse carrier-to-noise ratio equals approximately $1/B$, where B is the effective overall bandwidth of the receiver. In addition, in order that the interruption of the message signal by the test pulses not interfere appreciably with message communication, the test pulse interval T should be considerably shorter than the shortest message impulses to be communicated. These relationships are well met in a frequency modulation system having an index of modulation greater than 1, such as 5. Therefore frequency modulation transmission is the desired mode, especially for high speed digital pulse transmission, although other modes of transmission producing equivalent performance are also satisfactory. Use of frequency modulation also has the further advantage that the amplitude of the frequency-modulated carrier wave can readily be detected and compared at the receiver, for example at the output of the IF amplifier, despite its modulation. In one typical embodiment the duration of each of the test pulses may be about 3 microseconds with a recurrence rate of 200 cycles per second, the IF bandwidth about 300 kilocycles per second, the effective receiver information channel bandwidth about 24 kilocycles per second and the index of frequency modulation $m$ about 5. In general, the IF bandwidth is approximately equal to twice the base bandwidth multiplied by 1 plus the index of modulation.

Figure 4A:
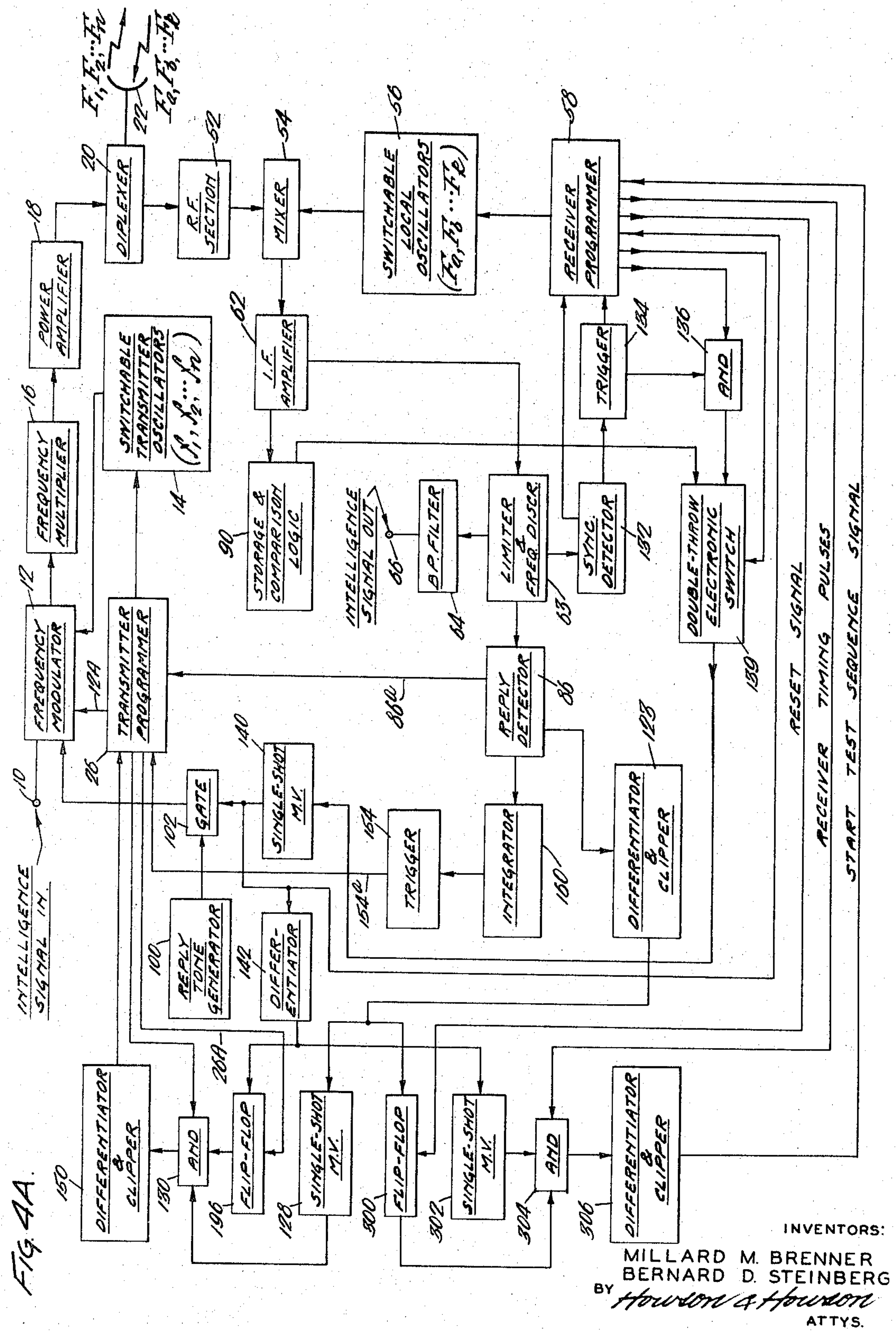
FIGURES 4A and 4B are block diagrams together illustrating in more detail a preferred embodiment of the invention.
Figure 4B:
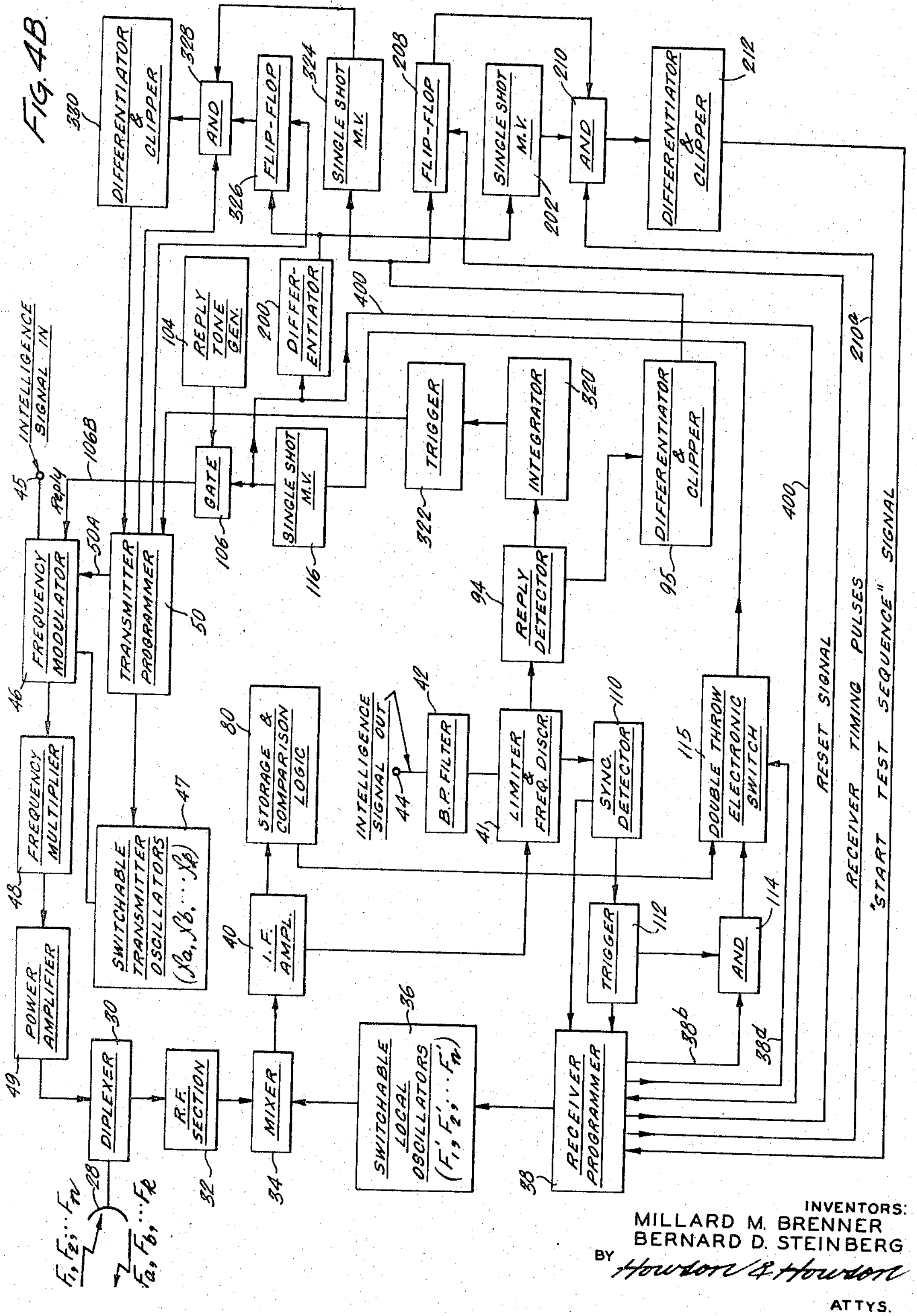

As mentioned previously, in the form of the system in accordance with the invention in which the receivers are of the superheterodyne type utilizing local oscillators, it is important to assure that the frequency of each local oscillator be stepped through the proper frequencies at the right times to produce the desired intermediate frequency as the different test and message carrier frequencies are received. While this may be done by means of a master-slave synchronizing system in which one of the terminal equipments controls the timing not only of its internal operations but also directly controls the timing of all of the operations for the other terminal equipment, such arrangements generally require a knowledge of the propagation distance between the two equipments and prearrangement between operators of the terminal equipments as to which terminal equipment is to be the master and which the slave, and hence are not suitable for use where one or more of the two terminal equipments are mobile or where they are to be used interchangeably without special prearrangements. FIGURES 4A and 4B illustrate a frequency diversity system of the invention like that shown in FIGURE 1 but show in detail a particularly advantageous form of synchronizing and timing control arrangement in accordance with a further feature of the invention which is particularly adapted for use with the diversity system of the invention described above and which permits independent timing control and synchronization for both directions of communication without requiring knowledge of the separation between the two terminal equipments or special prearrangement between the operators.

Referring to the latter figures, terminal equipment A shown in FIGURE 4A includes a number of elements which have been shown and described previously with respect to FIGURE 1 and are indicated by corresponding numerals, namely: intelligence signal input terminal 10, frequency modulator 12, switchable transmitter oscillators 14, frequency multiplier 16, power amplifier 18, diplexer 20, antenna 22, RF section 52, mixer 54, switchable local oscillators 56, IF amplifier 62, limiter and frequency discriminator 63, bandpass filter 64, intelligence signal output terminal 66, storage and comparison logic circuit 90, transmitter programmer 26 and receiver programmer 58; reply signal generator 92 of FIGURE 1 is shown in more detail in FIGURE 4A as comprising reply tone generator 100 and gate 102. The remainder of FIGURE 4A comprises details of the timing control and synchronizing circuits 70 of FIGURE 1.

FIGURE 4B shows in more detail the terminal equipment B of FIGURE 1, the following elements indicated by corresponding numerals being the same as in FIGURE 2B: antenna 28, diplexer 30, RF section 32, mixer 34, switchable local oscillators 36, receiver programmer 38, IF amplifier 40, limiter and frequency discriminator 41, bandpass filter 42, intelligence signal output terminal 44, intelligence input terminal 45, frequency modulator 46, frequency multiplier 48, power amplifier 49, transmitter programmer 50, storage and comparison logic circuit 80, and reply detector 94; reply signal generator 82 of FIGURE 1 is shown in FIGURE 4B as comprising a reply tone generator 104 and a gate 106. The remainder of the system comprises elements of a particular form of the timing control and synchronizing circuits 72 of FIGURE 1.

As in FIGURE 1, terminal equipment A of FIGURE 4A is the same as terminal equipment B of FIGURE 4B with the exception of using different carrier-wave and local oscillator frequencies, and operates analogously. In the interest of definiteness only, the system of FIGURES 4A and 4B will be described with reference to certain representative values of parameters and certain forms for the various elements thereof, again without thereby in any way limiting the scope of the invention.

By way of example, the transmitted carrier frequencies for terminal equipment A may be $F_1=1000$ mc./s., $F_2=1004$ mc./s., $F_3=1008$ mc./s., $F_4=1012$ mc./s., $F_5=1016$ mc./s., $F_6=1020$ mc./s. and $F_7=1024$ mc./s.; terminal equipment B may for example transmit on 7 carrier frequencies similarly spaced from each other by about 4 mc./s. in the range from 1050 to 1074 mc./s. Transmitter programmer 26 as terminal equipment A generates a continuous synchronizing sinewave which is applied to a modulator input of frequency modulator 12 over line 12A to produce a 200 c.p.s. frequency modulation of whichever of the frequencies $F_1$ through $F_7$ is being transmitted by antenna 22 at that time. The program of transmitter programmer 26 is such that before initial synchronization has been established between terminal equipments A and B, the transmitted carrier frequency from antenna 22 is $F_1$ and the programmed shifting of carrier frequency does not begin until after an initial synchronizing operation has taken place involving both of terminal equipments A and B, as will now be described.

Figure 5:
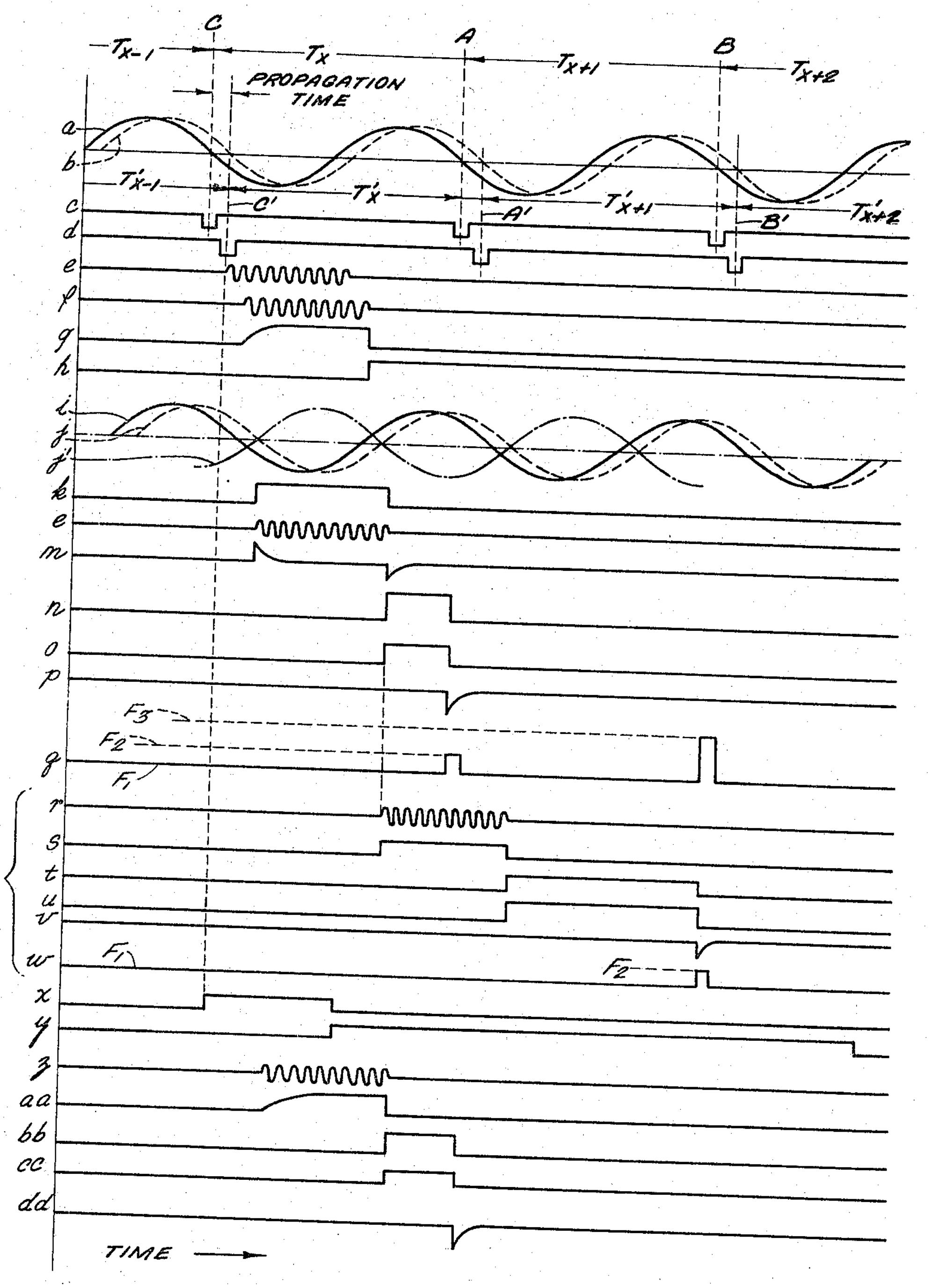
FIGURE 5 is a further graphical representation to which reference will be made in explaining the operation of the later preferred embodiment of the invention.

FIGURE 5 comprises plots of various signals in the system of FIGURES 4A and 4B to a common time scale of abscissae. At $a$ it shows in full line the above-described 200 c.p.s. continuous synchronizing signal which is frequency-modulated onto the initial transmitted carrier of frequency $F_1$. During the initial synchronization process this carrier-wave of frequency $F_1$ modulated by this synchronizing signal is transmitted to terminal equipment B and at the latter equipment passes through diplexer 30 and RF section 32 to mixer 34, wherein it is heterodyned with a local oscillator signal from switchable local oscillators 36 which is of frequency $F'_1$ during the initial synchronizing process as determined by a control signal from the receiver programmer 38, so as to produce the proper intermediate frequency for amplifier 40.

The dotted curve $b$ in FIGURE 5A shows the synchronizing modulation component but as it is received at terminal equipment B, delayed somewhat by the propagation time for signals between the two terminal equipments. Also shown in FIGURE 5 are the successive negative-going crossings of the zero axis by the synchronizing signal $a$, which are designated as C, A and B; the corresponding negative-going zero-axis crossings of the received synchronizing signal $b$ are designated by C', A' and B'. The four successive periods of the transmitted synchronizing signal $a$ are designated respectively as $T_{x-1}$, $T_x$, $T_{x+1}$ and $T_{x+2}$ and the corresponding periods of the received synchronizing wave $b$ are designated respectively as $T'_{x-1}$, $T'_x$, $T'_{x+1}$ and $T'_{x+2}$. Delays in the signals other than those shown may of course occur due to the characteristics of electrical filters or other circuitry and it will be understood that these should be taken account of in constructing a system according to the invention.

The synchronizing modulation on the IF carrier is detected by limiter and frequency discriminator 41 and supplied to sync detector 110, which may comprise a high-Q tuned circuit resonant at the synchronizing signal frequency of 200 c.p.s. and a rectifying time-constant circuit which, under conditions favorable for tropospheric propagation at frequency $F_1$, produces an output sufficient after a few cycles of synchronizing signal to operate a trigger circuit 112. The sync detector therefore provides both a "flywheel" effect and a threshold effect. This is used to detect absence of the 200 cycle wave, which restores the trigger to its initial condition and tells the programmer to start the initial synchronizing process. The flywheel effect is important in maintaining sync despite occasional deep fading or other interruption to the carrier which temporarily lowers it below the FH threshold. Sync detector 110 supplies the detected sync signal to receiver programmer 38, both directly as a 200 c.p.s. sinewave and as a DC input by way of trigger circuit 112. The receiver programmer 38 responds to the simultaneous application thereto of signals from trigger circuit 112 and directly from sync detector 110 to generate timing pulses shown in FIGURE 5D coincident with the negative-going zero crossings of the received synchronizing signal of FIGURE 5B; these timing pulses are used for receiver timing purposes generally as will be described hereinafter, and specifically are applied by way of connection 38B to one control input of AND circuit 114. The output of trigger 112 is also supplied to the other control input of AND gate 114, so that, when trigger 112 is operated in response to an adequate received synchronizing signal, each timing pulse from receiver programmer 38 produces a simultaneous output pulse from AND gate 114 which is supplied via single-pole double-throw electronic switch 115 when operated to the initial sync condition by way of line 38D, to a single-shot multivibrator 116. In response thereto, multivibrator 116 generates a train of pulses similar to the one shown at *x* of FIGURE 5, each one of which begins at the time of the receiver timing pulse and ends after a substantial fraction of the 200-cycle period, for example one-half of $T_x$. The latter single-shot output pulse operates gate 106 to be open for a corresponding interval so that a burst of oscillations from reply tone generator 104 can then pass to a modulating input terminal of frequency modulator 46 over connection 106B. The burst of reply signal, which is at a frequency high compared with the synchronizing wave frequency, for example 2,000 c.p.s., is shown in FIGURE 5 at *e*, and frequency modulates the terminal-equipment-B initial carrier frequency $F_a$ and is sent back through the troposphere to terminal equipment A when conditions are favorable for transmission of $F_a$.

Because of propagation delay, the latter reply signal modulation reaches terminal equipment A delayed by the propagation time, which is small compared with the 200-cycle period, and is represented at *f* of FIGURE 5. It is received by antenna 22 and passed through diplexer 20, RF section 52, mixer 54, IF amplifier 62 and limiter and frequency discriminator 63 to reply detector 86, the switchable local oscillators 56 then providing oscillations to mixer 54, as controlled by receiver programmer 58, at an initial frequency $F'_a$ to provide the proper carrier frequency for IF amplifier 62. Reply detector 86 may include a 2,000-cycle bandpass filter for selecting the reply signal and appropriate logic circuitry for producing a pulse output in response thereto in response to each such burst of reply signal. Preferably reply detector 86 feeds a differentiator and clipper 123 which produces an output pulse only when the received reply signal is terminated. The voltage at the output of reply detector 86 is shown at *g* in FIGURE 5, the aforesaid output pulse from differentiator and clipper 123 being generated coincident with the trailing edge of the pulse of FIGURE 5*g*. The trailing edge pulse from differentiator and clipper 123 is supplied to the trigger output terminal of single-shot multivibrator 128 to operate it, for a time which is preferably at least as long as two cycles of the 200-cycle synchronizing wave, as shown in FIGURE 5 at *h*. The output of single-shot multivibrator 128 is then supplied to one input terminal of three-input AND gate 130 as an indication that the synchronizing wave has been successfully transmitted from terminal equipment A to terminal equipment B on the carrier frequency $F_1$ and that a reply signal has been successfully transmitted from terminal equipment B to terminal equipment A on frequency $F_a$.

Meanwhile, at terminal equipment B the synchronizing signal shown at *i* of FIGURE 5, which may be at approximately 200 c.p.s. is generated by an oscillator in transmitter programmer 50, is supplied to a modulating input of frequency modulator 46 from transmitter programmer 50 via connection 50A, and is transmitted as modulation of the carrier of frequency $F_a$, arriving at terminal equipment A at the time indicated by curve *j* of FIGURE 5. It is then processed by terminal equipment A in the same manner as is the received synchronizing signal at terminal B, in this case by means of diplexer 20, RF section 52, mixer 54, switchable local oscillators 56 operating at frequency $F'_a$ as determined by receiver programmer 58, IF amplifier 62, limiter and frequency discriminator 63, sync detector 132, trigger 134, AND circuit 136, electronic switch 139, single-shot multivibrator 140, gate 102 and reply tone generator 100. Operation of gate 102 constitutes an indication that a reply signal is being applied to frequency modulator 12 for transmission from terminal equipment A to terminal equipment B on the carrier frequency $F_1$, and in fact the pulse output of single-shot multivibrator 140 corresponds to the envelope of the reply signal so transmitted so far as its timing is concerned. Accordingly, the output of multivibrator 140 shown at *k* of FIGURE 5 is supplied by way of a suitable differentiator 142 to a control input of flip-flop 146, which is actuated to an opposite state by the spike produced by differentiation of the trailing edge of the multivibrator 140 output pulse and shown in FIGURE 5*m*. Flip-flop 146 is reset by the next-occurring one of the timing pulses supplied thereto over connections 26A, the latter pulses as shown at *c* of FIGURE 5 occurring coincident with the negative-going zero crossings of the terminal-equipment-A synchronizing signal shown at *a* of FIGURE 5. The resultant pulse from flip-flop 146 is shown at *n* of FIGURE 5 and constitutes an indication from its inception that a reply signal has been completed at terminal equipment A. The output pulse of flip-flop 146 is supplied to a second input terminal of three-input AND gate 130.

In addition, AND gate 130 is supplied at its third input terminal with the timing signals from transmitter programmer 26, which are shown at *c* of FIGURE 5, in a polarity such that it is the portion of the latter timing signal occurring between the timing pulses which tends to operate the AND gate. Accordingly AND gate 130 is actuated to initiate an output pulse, shown at *o* of FIGURE 5, upon the operation of single-shot multivibrator 128 indicating that a signal has been successfully transmitted to terminal equipment B and an adequately-strong reply signal has been received therefrom in the interval $T_x$, simultaneously with the occurrence of the operated condition of flip-flop 146 indicating that transmission of a reply signal from terminal equipment A has been completed in the interval $T_x$ preceding zero-crossing A, and simultaneously with a signal from the programmer 26 indicating that a test is not in progress at A. The occurrence of the next one of the timing pulses shown at A of FIGURE 5*c*, supplied to flip-flop 146 over connection 26A, then causes the flip-flop 146 to reset, terminating the AND gate output pulse.

The latter AND gate output pulse is supplied to a differentiator and clipper 150 which produces an output spike coincident with the trailing edge of the AND gate output pulse, as shown at *p* of FIGURE 5, which is supplied to transmitter programmer 26 to terminate the initial synchronization operation by causing transmitter programmer 26 to institute the above-described programmed sequence of shifts in the oscillator frequency supplied to frequency modulator 12 from switchable transmitter oscillator 14; the first two such shifts are illustrated at *q* of FIGURE 5. Preferably the sequence-initiating spike from differentiator and clipper 150 is applied in transmitter programmer 26 to cause a substantial number of complete sequence, e.g. 20, of oscillator frequency shifts to occur in response to a single spike, after which sequencing stops and initial synchronizing conditions are resumed unless a sequence-maintaining control signal has been by then developed by trigger circuit 154 and applied to another control input of the programmer by way of connection 154A. To operate trigger circuit 154, an integrator circuit 160 is supplied with output signals from reply detector 86 and after being supplied with a few reply signal, even if not in sequence, serves to develop an output voltage sufficient to operate the trigger circuit 154. However should there be a breakdown in communication between the two terminal equipments such that the synchronizing signal derived by sync detector 110 at terminal B is insufficient to operate trigger 112, the receiver programmer 38 will not cause the generation at terminal equipment B of the reply signal described above. If this situation continues for a substantial number of cycles of the 200 c.p.s. synchronizing signal, the corresponding repetitive absence of output from the reply detector 120 at terminal equipment A permits integrator 160 to discharge, deactivating trigger circuit 154 and permitting transmitter programmer 26 to resume initial synchronizing operation. In this connection it is important to note that under normal operating conditions a reply signal is generated by the storage and comparison logic 80 at terminal B when the carrier frequency is measured as stronger than the test frequency, and not generated when the test frequency is measured as stronger than the carrier frequency. Since the former case is much more likely when operation is normal, integrator 160 at terminal A will be maintained in a sufficiently charged condition when the system is functioning and will only discharge due to malfunctioning or an exceedingly unlikely succession of 20 or so test measurements each indicating that the test carrier is stronger than the previously-selected carrier.

Termination of the initial synchronization operation also transfers control of single-shot multivibrator 140 from AND circuit 136 to the output of storage and comparison logic 90, via switch 139. This transfer places the reply signal from reply tone generator 100 under control of the storage and comparison logic, which causes a reply to be made when the carrier in use has greater amplitude than the test carrier.

Returning now to the description of the initial synchronizing process for the transmitter at terminal equipment A and referring to graph *i* of FIGURE 5, it will be understood that while the synchronizing signals there shown which are generated at terminal equipment B are recurrent approximately at 200 cycles per second in the present example, they bear no definite fixed phase relationship to those generated at terminal equipment A as shown at *a* of FIGURE 5. The arbitrarily chosen phase of the terminal-equipment-B sync waves shown at *i* of FIGURE 5 is such that the reply signal produced in response thereto at terminal equipment A, and shown at 1 of FIGURE 5, terminated prior to the end A of the time interval $T_x$, so that the initial synchronizing operation was terminated at the time A. If a different phase had been chosen between waves *a* and *i*, the reply pulse as received by terminal B, from terminal A might not have operated the differentiator and clipper fed by reply detector 94 until after the end A′ of interval $T_x'$ (or the end A″ of any corresponding interval $T_x''$). For example, if the waveform of FIGURE 5 occurs at a later time as represented at *j*′ of FIGURE 5, the operation indicated in graphs *r* through *w* of FIGURE 5 occurs.

Curve *r* illustrates such a late-occurring reply signal from terminal equipment A produced by the opening of gate 102 in response to the output pulse from single-shot multivibrator 140 shown at *s* of FIGURE 5. The latter pulse, acting through differentiator 142 to trigger flip-flop 146, causes the output pulse from the latter flip-flop to begin the interval $T_{x+1}$ and end at time B, as shown at *t* of FIGURE 5. As shown at *u* of FIGURE 5, the corresponding output pulse from AND circuit 130 therefore also begins during the time interval $T_{x+1}$ and ends at the time B at the end of the latter interval. As shown at *v* of FIGURE 5, a differentiated spike coincident with the end of the AND circuit 130 output pulse occurs at the latter time B and terminates the initial synchronizing process through control of transmitter programmer 26 at the latter time, to institute the sequenced shifting of the transmitter carrier frequency as illustrated at *w* of FIGURE 5. Accordingly, the transmitter frequency programming begins at the time A or the time B depending upon whether the reply signal generated at terminal equipment A begins early or late in the time period $T_x$.

The initial synchronization procedure for the receiver at terminal equipment B will now be described. It will be recalled that it is desired to cause the receiver programmer 38 at terminal equipment B to terminate its initial synchronizing operation and to start the automatic sequencing of the frequencies of the local oscillators 36 only after the terminal equipment B has sent a reply signal to terminal equipment A, thereby demonstrating that communication on carrier frequency $F_1$ has occurred successfully, and terminal equipment B has received a reply from terminal equipment A thus demonstrating that frequency $F_a$ has also successfully produced communication. Furthermore the sequencing of the receiver local oscillators should begin at the time A′ of graph *b* of FIGURE 5 if the corresponding transmitter frequency sequencing is initiated at time A, and should start at time B′ if the transmitter sequencing is started at time B.

To accomplish this, a differentiator circuit 200 at terminal equipment B, which may be like differentiator 142 at terminal equipment A, is connected from the output of single-shot multivibrator 116 to the control input of a single-shot mutivibrator 202, which may be constructed like single-shot multivibrator 128 at terminal equipment A. Graph *x* of FIGURE 5 shows the single-shot multivibrator output pulse, which is coexistent with the terminal equipment B reply shown in *e* of FIGURE 5; graph *y* of FIGURE 5 shows the corresponding output of single-shot multivibrator 202, comprising a pulse which preferably continues for several period of the 200-cycle wave and by its inception indicates that a reply has been sent from terminal equipment B to terminal equipment A.

Graph *z* of FIGURE 5 illustrates the reply signal burst from terminal equipment A as received at terminal equipment B, delayed by the propagation time with respect to the reply signal transmitted from terminal equipment A as shown at 1 of FIGURE 5, as synhcronized by the 200 c.p.s. wave *i* generated at terminal B. As illustrated by FIGURE 5, graph *aa*, the reply detector 94 at terminal equipment B, which may be like the coresponding device of terminal equipment A, generates a pulse coexistent with the reply signal, and differentiator and clipper 95 derives therefrom a narrow output pulse which is supplied to flip-flop 208, which may be like flip-flop 146 at terminal equipment A. Flip-flop 208 responds to initiate immediately the output pulse shown at *bb* of FIGURE 5, which latter pulse is terminated by the next receiver timing pulse applied from receiver programmer 38 at the time A′. The output of flip-flop 208, indicative of the reception of a reply from terminal equipment A, is supplied to one control input terminal of AND gate 210, which may be like AND gate 130 of terminal equipment A. The output of single-shot multivibrator 202 is applied to another control input of AND gate 210 and is indicative of the fact that terminal equipment B has sent a reply back to terminal equipment A; the third input terminal of AND gate 210 is supplied by way of connection **210*a*** with the receiver timing pulse signal from receiver programmer 38, the latter signal being of the polarity to tend to actuate AND gate 210 during intervals between the timing pulses.

Accordingly, an output pulse is initiated from AND gate 210 during $T'_x$ upon the inception of the output from single-shot multivibrator 202 and is terminated upon the occurrence of the next receiver timer pulse at time A′, as shown in graph *cc* of FIGURE 5. The output of AND gate 210 is then supplied to differentiator and clipper 212, which may be like differentiator and clipper 150 at terminal equipment A. The output of differentiator and clipper 212 comprises a spike coincident with the trailing edge of the AND gate output pulse, as shown at *dd* of FIGURE 5, which is applied to the receiver programmer 38 to terminate the initial synchronizing process and start the sequencing of the shifting of the local oscillators 36 through their programmed sequence of frequencies $F'_1$, $F'_2$, etc. at time A′.

It will be understood that since the reply signal from terminal equipment A to terminal equipment B occurs at a time determined by the phase of the terminal equipment B transmitted synchronizing wave, the output pulse from flip-flop 208 represented at *bb* of FIGURE 5 varies arbitrarily with respect to the phase of the terminal-equipment-A transmitted synchronizing wave, and in fact may not begin until after the time A′. In the latter event the output pulse of AND gate 210 will begin and end in the interval $T'_{x+1}$ and will produce from differentiator and clipper 212 a voltage spike for actuating receiver programmer 38 at the later time B′.

It will therefore be appreciated that the transmitting equipment of terminal equipment A and the receiving apparatus of terminal equipment B are thereby caused to change from the initial synchronizing procedure to the automatically-sequenced program of frequency shift in the transmitted carrier wave and in the receiver local oscillator at the times A and A′ respectively (or B and B′), and to step synchronously through the corresponding transmitted carrier wave and local oscillator frequencies during the subsequent test frequency intervals as necessary to provide proper reception.

It will also be understood that in view of the fact that the two terminal equipments employ the same apparatus, exactly the same operation is provided with respect to producing and maintaining synchronization between the terminal equipment B transmitted frequencies $F_a$, $F_b$ . . . $F_k$ and the terminal equipment A local oscillator frequencies $F'_a$, $F'_b$ . . . $F'_k$. Since the accomplishment of initial synchronization in the two directions depends upon the same factors, namely adequate tropospheric propagation on the carrier-wave frequencies transmitted by both terminal equipment, both equipments will normally become synchronized at about the same time. In this connection it will be understood that terminal equipment A employs a flip-flop 300, a single-shot multivibrator 302, and AND circuit 304 and a differentiator and clipper circuit 306 which are the same as, and operate in the same manner as, the corresponding elements 208, 202, 210 and 212 described above with reference to terminal equipment B; and that terminal equipment B employs an integrator 320, a trigger circuit 322, a single-shot multivibrator 324, a flip-flop 326, an AND gate 328 and a differentiator and clipper circuit 330, which are the same as, and operate in the same manner as, the corresponding elements 160, 154, 128, 146, 130 and 150 of terminal equipment A.

As described previously, once synchronization has been established each storage and comparison logic circuit, for example 80 of terminal equipment B, stores a signal indicative of the amplitude of the carrier frequency received during the just-completed message interval and compares it with the amplitude of the received carrier wave signal produced during the next test interval. If the latter test frequency produces a usable received signal stronger than the pre-existing message carrier, the storage and comparison logic circuit 80 produces no output to single-shot multivibrator 116 and hence no reply signal is returned to equipment A and the transmitter programmer 26 automatically shifts the message carrier to the test frequency. On the other hand, if the received and stored signal produced in response to the message carrier equals or exceeds that due to the next transmitted test frequency, then storage and comparison logic circuit 80 actuates single-shot multivibrator 116 to transmit a reply signal to terminal equipment A which signal, at the latter equipment, is detected by reply detector 86 and passed via lead 86*a* to transmitter programmer 26 to hold the message carrier frequency at the same value during the next succeeding message interval. Regardless of whether or not the message carrier frequency is changed, the test frequency sequence continues to occur. An exactly analogous operation is produced by storage and comparison logic circuit 90 at terminal equipment A.

In addition, when the storage and comparison logic circuit 80 at terminal equipment B produces a reply signal as described above, it also causes the receiver programmer at terminal equipment B to maintain the same local oscillator frequency during the next message interval as during the immediately-previous message interval; this control function is provided by supplying the output pulse from single-shot multivibrator 116 to receiver programmer 38 over connection 400. If instead the next received test pulse produces a stronger received signal than does the preceding message carrier, there is no output produced by the single-slot multivibrator 116 and receiver programmer 38 then automatically changes the local oscillator frequency to the next value in its programmed sequence.

Since the reply signal is a burst of sinewave of relatively long duration and high frequency compared with the duration and repetition rate of the test interruption interval, the test and reply signals have entirely different frequency spectra and are easily separated by appropriate filters.

Accordingly an advantageous synchronizing arrangement has been provided which permits use of essentially independent terminal equipments employing superheterodyne receivers in a frequency diversity system of the invention, which arrangement does not require prearrangement between the operators other than agreement as to the values of $F_1$ and $F_a$, or knowledge of the distance between terminal equipments, and minimizes interference among the synchronizing and timing signals, the test interval interruption signals and the message signals.

Figure 6A:
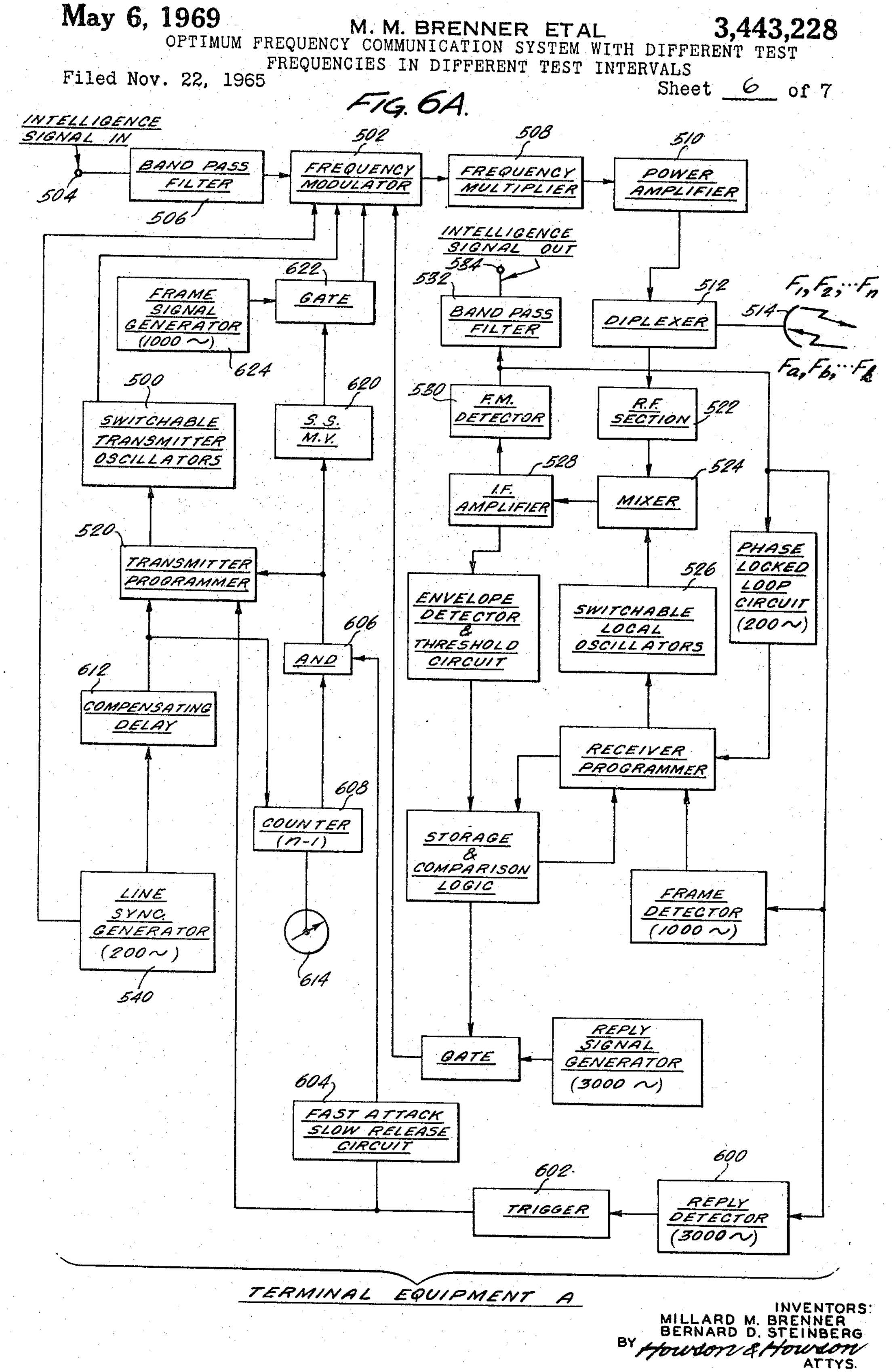
FIGURES 6A and 6B are block diagrams together showing another embodiment of the invention.
Figure 6B:
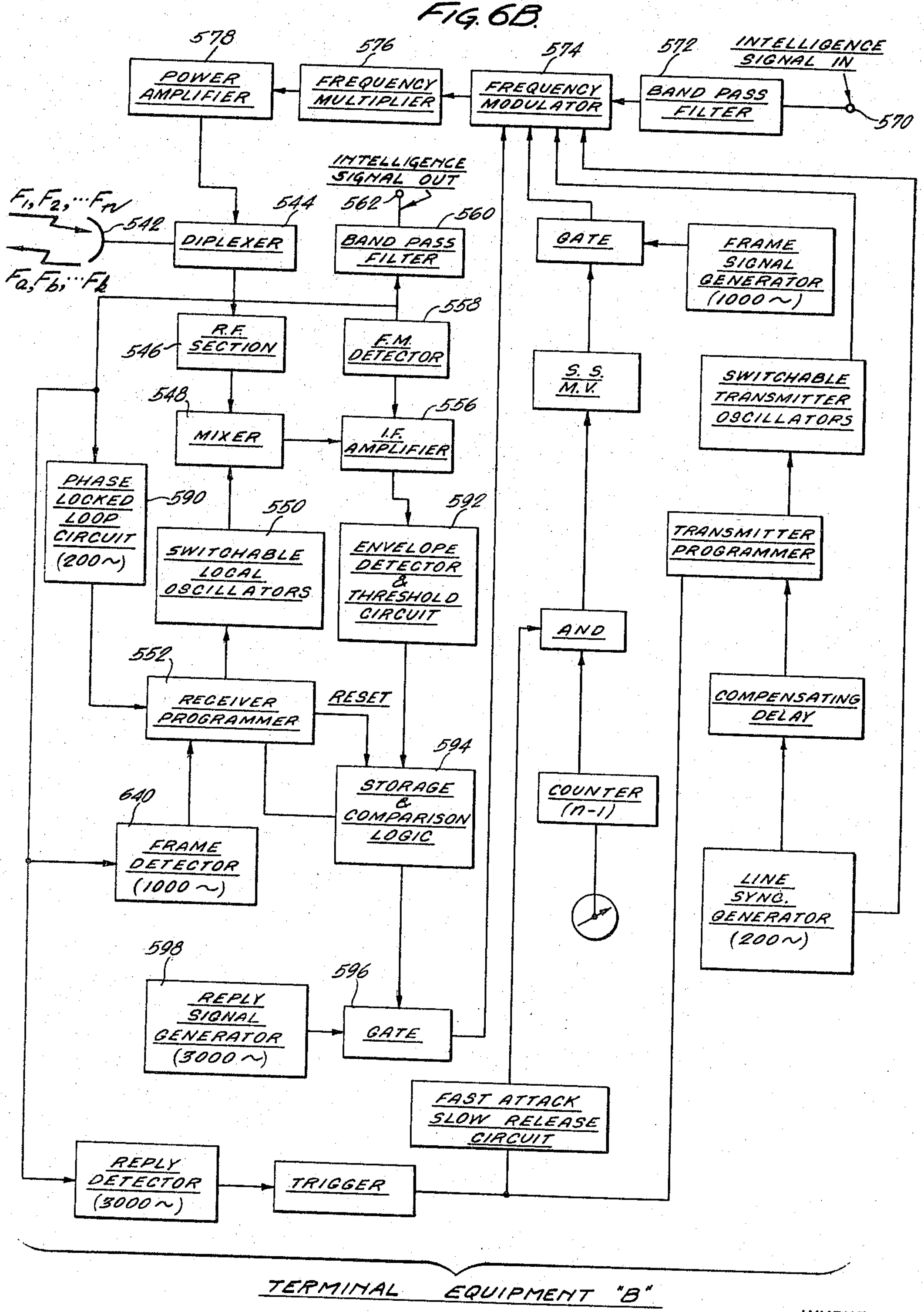

FIGURES 6A and 6B together show another form of two-way communication system embodying the invention in one form and utilizing a different type of synchronizing system. FIGURE 6A represents terminal equipment A which is understood to be separated by a space link, involving a tropospheric propagation path, from terminal equipment B of FIGURE 6B. Terminal equipment A transmits carrier frequencies $F_1$, $F_2$ . . . $F_n$ while terminal equipment B transmits carrier frequencies $F_a$, $F_b$ . . . $F_k$. As in the previously described system, a bank of switchable transmitter oscillators 500 supplies carrier-wave signals to a frequency modulator 502, which is also supplied with the intelligence input from terminal 504 by way of a bandpass filter 506, which limits the input intelligence to frequencies above those utilized in this system for synchronizing purposes. in the present example to frequencies above about 3,000 c.p.s.; the output of frequency modulator 502 is passed through a frequency multiplier 508 and a power amplifier 510 to a diplexer 512, whence it is applied to radiating and receiving antenna 514 for radiation into the space link and to the terminal equipment B. Switchable transmitter oscillators 500 may consist of a bank of plug-in crystal-controlled oscillators, the oscillator whose output is applied to frequency modulator 502 at any time being determined by signals supplied thereto from transmitter programmer 520.

Also as in the case of the previously described equipment, terminal equipment A includes apparatus for receiving signals transmitted by terminal equipment B, comprising the diplexer 512, the RF section 522, the frequency mixer 524, a bank of switchable local oscillators 526 applying local oscillations to mixer 524, an IF amplifier 528 supplied with the output from mixer 524, an FM detector 530 for detecting the frequency modulation of the IF amplifier output, and a bandpass filter 532 for selecting the intelligence signals from the FM detector output and for applying them to the intelligence output terminal 534. The remainder of terminal equipment A cooperates with the transmitter and receiver programmers to produce the desired synchronization between each transmitter and its corresponding remote receiver, involving again an initial synchronizing operation and a subsequent synchronizing operation for porperly controlling the timing of test frequency transmission and reception and for changing the carrier frequency depending upon the results of the test procedure.

More particularly, at terminal equipment A a line sync generator 540 generates a continuous sinewave, which may for example be at 200 c.p.s. The designation "line" sync is utilized by analogy to television synchronizing and in the present system represents the rate at which the individual test frequency pulses occur in each sequence, as contrasted to the term "frame" sync which represents the rate at which the separate sequences recur. The output of line sync generator 540 is supplied to a modulation control input of frequency modulator 502, continuously to modulate the carrier wave at the 200 cycle rate so that the 200-cycle line sync is transmitted to terminal equipment B.

Terminal equipment B includes a receiving and transmitting antenna 542 connected to a diplexer 544 which feeds received signals to RF section 546 and thence to mixer 548, the latter mixer being supplied with local oscillator signals from local oscillators 550. The latter oscillators are controlled by receiver programmer 552. The output of mixer 548 is passed through IF amplifier 556 to FM detector 558 and thence through bandpass filter 560, which selects the intelligence signals for application to intelligence output terminal 562. Intelligence to be communicated from terminal equipment B to terminal equipment A is applied to intelligence input terminal 570 by way of a bandpass filter 572 for limiting the intelligence to frequencies above the various synchronizing signal frequencies, and thence is applied to a modulation input of frequency modulator 574. The output of frequency modulator 574 is passed through frequency multiplier 576 and power amplifier 578 to diplexer 544 whence it is applied to antenna 542 for radiation to the terminal equipment A.

Initially the transmitter and receiver programmers of both equipments maintain the transmitted carrier frequencies at the various reference values $F_1$ and $F_a$, and the oscillator frequencies at the reference frequencies $F'_1$ and $F'_a$, at terminal A and terminal B respectively, so that each receiver is receptive to signals transmitted by its corresponding remote transmitter. During the initial synchronizing process, the line sync signal from generator 540 which is applied to frequency modulator 502 is transmitted as frequency modulation of the carrier wave of frequency $F_1$, and passes through diplexer 544, RF section 546, mixer 548, IF amplifier 556 and FM detector 558, the latter device serving to detect the 200 cycle modulation. The output of the FM detector is applied to a phase-locked loop circuit 590 which operates at the 200 cycle rate and is locked in phase with and by the received and detected 200 cycle line sync signal supplied thereto. The output of the phase-locked loop circuit 590 is supplied to receiver programmer 552 to synchronize the switching circuits therein which are utilized to switch local oscillators 550 during the test frequency intervals. However, during the initial synchronizing process the receiver programmer does not actually switch the local oscillator frequencies, but only begins to do so upon application to the receiver programmer of a frame synchronizing signal.

The output of IF amplifier 556 is also supplied to an envelope detector and threshold circuit 592, which detects the amplitude of the received carrier wave and, when the amplitude is above a predetermined threshold level, supplies an output signal to storage and comparison logic circuit 594. The latter circuit supplies an output to receiver programmer 552 to cause it to maintain the local oscillator frequency at the value $F'_1$, and also supplies an output to gate 596 to permit passage through the gate of a continuous-wave oscillation generated by reply signal generator 598, which may for example operate at 3,000 c.p.s. Accordingly, while gate 596 is so operated it supplies a continuous-wave reply signal to frequency modulator 574 to modulate the carrier wave of frequency $F_a$, and in this way is transmitted back to terminal equipment A.

In response thereto, the FM detector 530 at terminal equipment A produces an output signal containing the reply signal of 3,000 c.p.s., which is applied to a reply detector 600 which responds selectively to the 3,000 c.p.s. frequency. When the carrier-wave signal of frequency $F_a$ is received in sufficient strength, the output of the reply detector 600 is sufficient to operate a trigger 602, the output of which is passed directly to transmitter programmer 520 and, by way of a fast attack and slow release circuit 604, to one input of a two-input AND circuit 606. The trigger output to the transmitter programmer causes it to maintain the transmitter oscillator output at the pre-existing carrier frequency, in this case $F_1$, while the trigger output to AND circuit 606 permits frame synchronizing pulses generated in counter 608 to pass through the AND circuit. To derive the latter frame synchronizing pulses, an output from the line sync generator 540 is passed through a compensating delay circuit 612 to the input of counter 608, which produces an output pulse for each $(n-1)$ cycles of input supplied thereto, where $n$ is the order of diversity of the system. The count of counter 608, and hence the diversity provided, can be adjusted by a manual control 614. The frame synchronizing pulse from counter 608 which passes through AND circuit 606 is applied to transmitter programmer 520 to start the transmitter test frequency sequencing. In the present example, the number of test pulses in each sequence is $(n-1)$, or one less than the order of diversity provided, because the transmitter programmer 520 is arranged to skip testing on that frequency equal to the immediately pre-existing message carrier frequency; however, it will be understood that if all test frequencies, including that of the immediately pre-existing message carrier, are included in each sequence, then the count of counter 608 will be $n$ rather than $(n-1)$.

Transmitter sequencing under the control of transmitter programmer 520 is properly started by the frame synchronizing pulse from AND circuit 606 because the AND circuit is actuated only when an adequate output signal is supplied by reply detector 600, and this only occurs when adequate transmission occurs at both carrier frequencies $F_1$ and $F_a$. In order to signal the receiving apparatus of terminal equipment B to begin synchronous sequencing of its local oscillators, the frame synchronizing pulse at the output of AND circuit 606 is used to actuate a single-shot multivibrator 620, which in response thereto generates an output pulse of preset duration and fixed, preset phase-relation to the frame synchronizing pulse. The single-shot multivibrator output pulse then operates gate 622 to permit a burst of continuous-wave frame synchronizing signal to pass from frame signal generator 624 to a modulating control input of frequency modulator 502. The transmitter programmer 520 in this example produces switching of the transmitter oscillators at each negative-going zero crossing of the line sync signal supplied thereto from compensating delay circuit 612, and the gate 622 is then preferably opened by single-shot multivibrator 620 near the positive-going zero crossings of the line sync supplied to transmitter programmer 520. The duration of the time interval during which gate 622 is opened is preferably a fraction of the 200 cycle period, for example about one-half of the latter period, and the frame signal from frame signal generator 624 may, for example, have a frequency of about 1,000 c.p.s.

The thousand-cycle frame signal modulation is then transmitted on the carrier $F_1$ to terminal equipment B along with the line sync signal described hereinbefore. The frame signal passes through the terminal equipment B receiving apparatus and appears in detected form at the output of FM detector 558, whence it is supplied to the input of the frame detector 640. The latter device selects the thousand-cycle signal from the FM detector output, preferably detects the envelope thereof, and supplies the resultant pulse to the receiver programmer 552 to cause the latter programmer to begin sequenced switching of the local oscillators 550 at the rate controlled by the phase-locked loop circuit 590. Starting of the receiver sequencing operation is proper at this time because the receipt of the frame signal constitutes an indication to terminal equipment B that successful transmission exists at both of the carrier frequencies $F_1$ and $F_a$.

As to the timing of the initiation of sequencing at transmitter programmer 520 and receiver programmer 552, it is noted that sequencing at transmitter programmer 520 is initiated upon the occurrence of the negative-going zero crossing of the line sync applied thereto which occurs next after the frame synchronizing pulse from AND circuit 606, and the frame synchronizing signal transmitted to terminal equipement B and applied to receiver programmer 552 signals the receiver programmer 552 to start test-frequency sequencing upon the next negative-going axis crossing of the line synchronizing signal from phase-locked loop circuit 590, and hence at the right time to produce the proper local oscillator frequency for the reception of the wave of carrier frequency $F_1$. The subsequent shifts in transmitter and local oscillator frequency during the test sequence then occur at the proper times as determined by the common line sync for both transmitter and receiver. It is noted that the frame sync applied to the transmitter programmer 520 is delayed by a predetermined amount in the compensating delay circuit 612, with respect to the line sync which is transmitted from terminal equipment A. This is because the line sync delivered to the receiver programmer at terminal equipment B is derived from the output of the FM detector 558 and hence is subjected to additional delay with respect to the output of the IF amplifier 556 from which the frequency-testing pulses are derived, the compensating delay circuit 612 therefore compensating for this difference in delay and causing all of these signals to reach and operate the receiver programmer 552 in the proper time relationship.

So long as the carrier wave frequency $F_1$ produces a signal at storage and comparison logic circuit 594 which is stronger than that there produced by any of the test pulses, the reply signal continues to be returned from terminal equipment B to terminal equipment A as a continuous wave, and the line and frame synchronizing signals and the sequencing of test frequencies repeat in a manner described above, each new sequence being initiated by a frame synchronizing pulse. However, should one of the test frequencies produce a signal at storage and comparison logic circuit 594 stronger than the immediately-preexisting message carrier, the output supplied from the latter circuit to receiver programmer 552 causes the latter programmer to shift the local oscillator frequency during the next message reception interval to the value appropriate for reception of carrier waves at the frequency of the test signal found to be superior; and the reply signal transmitted back to terminal equipment A from terminal equipment B is interrupted so that trigger circuit 602 is deactuated thereby to cause transmitter programmer 520 to shift its message carrier frequency to the test frequency found to be superior in the last test. In addition, should communication between the two equipments disappear for a substantial number of the 200 cycle intervals, the fast attack and slow release circuit 604 will gradually discharge and, after a number of such periods, deactuate AND circuit 606 so as to discontinue sequencing at the transmitter programmer 520 and discontinue transmission of the frame synchronizing signals, whereupon the system reverts to the initial synchronizing condition. The fast attack and slow release circuit 604 may be of a conventional form which responds to an input change in one direction to produce promptly a corresponding output signal, but which responds only slowly to a return of the input signal to its original level. This circuit therefore permits quick initial sync operation upon the occurrence of satisfactory transmission in both directions between the two terminal equipments, and prevents unnecessary reversion to the initial synchronizing state upon short interruptions in transmission during the normal sequencing operation.

It is noted that the sequence of test pulses from the transmitter and the sequence of corresponding local oscillator frequencies at the receiver is started over again by each frame synchronizing signal. Accordingly, by adjusting the manual control 614 at terminal equipment A to reduce the count produced by counter 608, the number of different test frequencies utilized in each sequence can be reduced from the maximum available to any desired extent, thereby correspondingly decreasing the order of diversity while maintaining proper sequencing at both transmitter and receiver.

Since terminal equipment A and terminal equipment B may be identical with the exception of the use of somewhat different values of carrier frequencies, the operations for the transmission of intelligence signals from terminal equipment B to terminal equipment A and the operation of the synchronizing and control circuits to permit such communication are the same as described above for the transmission of intelligence from terminal equipment A to terminal equipment B, and hence need not be described here in detail.

While the invention has been described in the interest of complete definiteness with respect to specific embodiments thereof, it will be appreciated that it can be embodied in a variety of diverse forms differing substantially from these particularly shown and described without departing from the socpe and spirit of the invention as defined by the appended claims.

We claim:

1. A diversity communication system, comprising:

transmitter means for transmitting a carrier-wave signal into a wave-propagation medium susceptible to variations in its wave-propagation characteristics;

said transmitter means comprising means for automatiatically shifting the frequency of said transmitted carrier-wave signal to predetermined test values during successive time-spaced test intervals, and means for modulating said carrier wave with intelligence-representing signals in the times between said test intervals, said test values of frequency being different for different ones of said test intervals;

receiver means remote from said transmitter means for receiving said transmitted carrier-wave signal;

means for generating, and for transmitting between said transmitter means and said receiver means, synchronizing informtion representative of the times of occurence of said test intervals;

said receiver means comprising signal storage and comparison means responsive to said synchronizing information and to said received carrier-wave signal for comparing the strength of said received carrier-wave signal during one of said test intervals in which it has a first frequency with the strength of said received carrier-wave signal at another time when it has a second frequency different than said first frequency to produce a reply signal indicative of which of said first and second frequencies produces a received signal of greater strength;

means for transmitting said reply signal from said receiver means to said transmitter means; and frequency control means at said transmitter means for controlling the carrier frequency of said transmitted signal in the times between said test intervals in response to said reply signal.

2. The system of claim 1, in which said receiver means comprises a superheterodyne receiver including local oscillator means of controllably switchable frequency, a mixer supplied from said local oscillator means, and an IF amplifier supplied from said mixer, and in which said transmitter means and said receiver means comprise means for shifting said frequency of said local oscillator, in synchronism with the occurrence at said receiver means of successive ones of said test intervals, to values producing a substantially constant intermediate frequency from said mixer.

3. The system of claim 1, in which said intelligence-representing signals comprise impulses having a predetermined minimum duration, and in which said test intervals are periodically-recurrent and have a duration short compared with said message interval and with said minimum duration of said intelligence-representing impulses.

4. A diversity communication system, comprising:

transmitter means for transmitting a carrier-wave signal which during time-spaced test intervals therein has substantially-fixed frequencies and during message transmission intervals between said test intervals is modulated in accordance with intelligence to be transmitted, said carrier frequency being substantially constant during a major portion of each said message transmission intervals but settable to different values for different ones of said message transmission intervals, the frequency of said signal during a given one of said test intervals differing from the frequency of said signal during the next test interval;

said transmitter means also comprising means for transmitting information representative of the times of occurrence of said test intervals;

receiver means for receiving said carrier-wave signal and said transmitted information, and for deriving a reply signal indicative of the strength of said received carrier-wave signal during one of said test intervals therein compared with its strength during another interval therein for which said carrier-wave frequency is different;

means for transmitting said reply signal to said transmitter means; and control means at said transmitter means for changing the frequency of said carrier wave to that value produced during said one test interval, and for maintaining it at said value during a subsequent message interval, in response to an indication by said reply signal that said received signal strength is greater during said one test interval than during said other interval.

5. A frequency diversity system, comprising:

transmitter means for transmitting a carrier-wave signal which has a substantially fixed frequency during each of a plurality of time-spaced test intervals and which is modulated in accordance with intelligence to be transmitted during message intervals occuring between said test intervals, the frequency of said signal during a given one of said test intervals differing from the frequency of said signal during the next test interval, the carrier frequency of said signal during said message transmission intervals being controllable to assume different values during different message transmission intervals;

said transmitter also comprising means for transmitting information representative of the times of occurrence of said test intervals;

receiver means for receiving said carrier-wave signal and said information, said receiver means comprising signal storage and comparison means responsive to said received carrier-wave signal and said received information for producing a reply signal which is indicative of the strength of said received carrier-wave signal during each of said test intervals relative to its strength during the message interval immediately preceding said each test interval;

means for transmitting said reply signal from said receiver means to said transmitter means; and means responsive to said transmitted reply signal for setting said carrier-wave frequency of said transmitted carrier-wave signal during any of said message intervals to the immediately-preceding test frequency each time said immediately-preceding test frequency has produced a received carrier-wave signal stronger than that received during the message interval occurring just prior to said immediately-preceding test frequency.

6. A frequency diversity system, comprising:

transmitter means for transmitting a carrier-wave signal which has a first substantially fixed carrier frequency during a first test interval therein, has a second, different, substantially-fixed carrier frequency during a second test interval therein following and spaced in time from said first test interval, and is modulated in accordance with intelligence to the transmitter during a first message interval extending between said first and second test intervals and during a second message interval following said second test interval;

said transmitter means also comprising means for transmitting information representative of the times of occurrence of said test intervals;

receiver means for receiving said carrier-wave sginal and said transmitted information, said receiver means comprising storage and comparison means responsive to said received carrier-wave signal and said received information for producing a reply signal indicative of whether said received carrier-wave signal is stronger during one of said test intervals than during said first message interval;

means for transmitting said reply signal to said transmitter means; and control means at said transmitter means for changing said carrier frequency and for maintaining it at its changed frequency during one of said message intervals in response to an indication by said reply signal that said carrier-wave signal is stronger during said one test interval than during said first message interval.

7. A frequency diversity system, comprising:

transmitter means for generating and radiating a carrier-wave signal having a frequency which, during successive periodically-recurrent test intervals, has predetermined test values which are fixed during each of said test intervals but which differ between successive test intervals according to a predetermined recurrent pattern; said signal, during mesage intervals occurring between said test intervals, having a carrier frequency which is electrically settable to any one of said test values of frequency;

receiver means for receiving said carrier-wave signal;

means for generating and transmitting between said transmitter means and said receiver means synchronizing information representative of the times of occurrence of said test intervals;

said receiver means comprising storage and comparison means responsive to said received carrier-wave signal and to said synchronizing information for comparing the strength of the received carrier-wave signal during each of said message intervals with the strength of said carrier-wave signal during the next-occurring of said test intervals to produce a reply signal indicating which of the compared signals is of the greater strength, said receiver means also comprising means for transmitting said reply signal to said transmitter means;

said transmitter means comprising means responsive to said reply signal for setting said carrier frequency during any given message interval to a value equal to that one of said test values last indicated by said storage and comparison means as producing the greater strength of received signal at said receiver means.

References Cited

UNITED STATES PATENTS

| | | | |
|---|---|---|---|
| 2,521,696 | 9/1950 | De Armond | 325—51 |
| 2,892,930 | 6/1959 | Magnuski et al. | 325—56 |
| 3,001,064 | 9/1961 | Alexis et al. | 325—63 X |
| 3,160,813 | 12/1964 | Biggi et al. | 325—56 X |

ROBERT L. GRIFFIN, *Primary Examiner.*

B. V. SAFOUREK, *Assistant Examiner.*

U.S. Cl. X.R.

325—63, 65; 343—175, 179